US 9,483,655 B2

United States Patent
Erofeev et al.

(10) Patent No.: US 9,483,655 B2
(45) Date of Patent: Nov. 1, 2016

(54) FILE BACKUP WITH SELECTIVE ENCRYPTION

(71) Applicant: CommVault Systems, Inc., Oceanport, NJ (US)

(72) Inventors: Andrei Erofeev, Marlboro, NJ (US); Rahul S. Pawar, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 373 days.

(21) Appl. No.: 14/042,095

(22) Filed: Sep. 30, 2013

(65) Prior Publication Data

US 2014/0281517 A1    Sep. 18, 2014

Related U.S. Application Data

(60) Provisional application No. 61/777,195, filed on Mar. 12, 2013.

(51) Int. Cl.
*H04L 29/06* (2006.01)
*G06F 21/62* (2013.01)
(Continued)

(52) U.S. Cl.
CPC ....... *G06F 21/6218* (2013.01); *G06F 11/1402* (2013.01); *G06F 21/60* (2013.01); *H04L 9/088* (2013.01); *H04L 9/0822* (2013.01); *H04L 9/0825* (2013.01); *H04L 9/0891* (2013.01);
(Continued)

(58) Field of Classification Search
CPC ............... G06F 21/62; G06F 21/6209; G06F 21/6218; G06F 2221/2107; G06F 21/70; G06F 21/78
See application file for complete search history.

(56) References Cited

U.S. PATENT DOCUMENTS 4,084,231 A    4/1978    Capozzi et al.
4,267,568 A    5/1981    Dechant et al.
(Continued)

FOREIGN PATENT DOCUMENTS

AU    2004227949    10/2004
CA    2498174    3/2004
(Continued)

OTHER PUBLICATIONS

Arneson, "Mass Storage Archiving in Network Environments" IEEE, Oct. 31-Nov. 1998; pp. 45-50.
(Continued)

*Primary Examiner* — Jayesh Jhaveri
(74) *Attorney, Agent, or Firm* — Knobbe, Martens, Olson & Bear, LLP

(57) ABSTRACT

A method for automatically encrypting files is disclosed. In some cases, the method may be performed by computer hardware comprising one or more processors. The method can include detecting access to a first file, which may be stored in a primary storage system. Further, the method can include determining whether the access comprises a write access. In response to determining that the access comprises a write access, the method can include accessing file metadata associated with the first file and accessing a set of encryption rules. In addition, the method can include determining whether the file metadata satisfies the set of encryption rules. In response to determining that the file metadata satisfies the set of encryption rules, the method can include encrypting the first file to obtain a first encrypted file and modifying an extension of the first encrypted file to include an encryption extension.

20 Claims, 18 Drawing Sheets

(51) Int. Cl.
 *G06F 21/60* (2013.01)
 *G06F 11/14* (2006.01)
 *H04L 9/08* (2006.01)
 *H04L 9/14* (2006.01)
 *G06F 21/70* (2013.01)
 *G06F 21/78* (2013.01)

(52) U.S. Cl.
 CPC .............. *H04L 9/0897* (2013.01); *H04L 9/14* (2013.01); *G06F 21/62* (2013.01); *G06F 21/6209* (2013.01); *G06F 21/70* (2013.01); *G06F 21/78* (2013.01); *G06F 2221/2107* (2013.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,420,996 A | 5/1995 | Aoyagi |
| 5,448,724 A | 9/1995 | Hayashi |
| 5,454,099 A | 9/1995 | Myers et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,966,448 A | 10/1999 | Namba et al. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,496,949 B1 | 12/2002 | Kanevsky et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,658,436 B2 | 12/2003 | Oshinsky et al. |
| 6,658,526 B2 | 12/2003 | Nguyen et al. |
| 6,721,767 B2 | 4/2004 | De Meno et al. |
| 6,760,723 B2 | 7/2004 | Oshinsky et al. |
| 6,959,327 B1 | 10/2005 | Vogl et al. |
| 7,003,641 B2 | 2/2006 | Prahlad et al. |
| 7,035,880 B1 | 4/2006 | Crescenti et al. |
| 7,130,970 B2 | 10/2006 | Devassy et al. |
| 7,162,496 B2 | 1/2007 | Amarendran et al. |
| 7,171,558 B1 | 1/2007 | Mourad et al. |
| 7,174,433 B2 | 2/2007 | Kottomtharayil et al. |
| 7,209,972 B1 | 4/2007 | Ignatius et al. |
| 7,246,207 B2 | 7/2007 | Kottomtharayil et al. |
| 7,266,200 B2 | 9/2007 | Lambert |
| 7,266,699 B2 | 9/2007 | Newman et al. |
| 7,277,941 B2 | 10/2007 | Ignatius et al. |
| 7,315,923 B2 | 1/2008 | Retnamma et al. |
| 7,315,924 B2 | 1/2008 | Prahlad et al. |
| 7,343,453 B2 | 3/2008 | Prahlad et al. |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,401,154 B2 | 7/2008 | Ignatius et al. |
| 7,409,509 B2 | 8/2008 | Devassy et al. |
| 7,440,982 B2 | 10/2008 | Lu et al. |
| 7,447,692 B2 | 11/2008 | Oshinsky et al. |
| 7,454,569 B2 | 11/2008 | Kavuri et al. |
| 7,480,803 B1 | 1/2009 | Marballi |
| 7,484,054 B2 | 1/2009 | Kottomtharayil et al. |
| 7,490,207 B2 | 2/2009 | Amarendran et al. |
| 7,496,766 B2 | 2/2009 | Kitamura |
| 7,500,053 B1 | 3/2009 | Kavuri et al. |
| 7,506,102 B2 | 3/2009 | Lev-Ran et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,581,077 B2 | 8/2009 | Ignatius et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,627,776 B2 | 12/2009 | Petruzzo |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |

(56) References Cited

U.S. PATENT DOCUMENTS

| | | | |
|---|---|---|---|
| 7,739,381 B2 | 6/2010 | Ignatius et al. | |
| 7,739,459 B2 | 6/2010 | Kottomtharayil et al. | |
| 7,747,579 B2 | 6/2010 | Prahlad et al. | |
| 7,757,043 B2 | 7/2010 | Kavuri et al. | |
| 7,769,961 B2 | 8/2010 | Kottomtharayil et al. | |
| 7,783,895 B2 | 8/2010 | Hori et al. | |
| 7,801,864 B2 | 9/2010 | Prahlad et al. | |
| 7,802,067 B2 | 9/2010 | Prahlad et al. | |
| 7,809,914 B2 | 10/2010 | Kottomtharayil et al. | |
| 7,861,050 B2 | 12/2010 | Retnamma et al. | |
| 8,009,833 B2 | 8/2011 | Uchikawa | |
| 8,131,964 B2 | 3/2012 | Retnamma et al. | |
| 8,140,786 B2 | 3/2012 | Bunte et al. | |
| 8,140,847 B1 | 3/2012 | Wu | |
| 8,156,086 B2 | 4/2012 | Lu et al. | |
| 8,170,995 B2 | 5/2012 | Prahlad et al. | |
| 8,190,647 B1 | 5/2012 | Pereira et al. | |
| 8,229,954 B2 | 7/2012 | Kottomtharayil et al. | |
| 8,230,195 B2 | 7/2012 | Amarendran et al. | |
| 8,285,681 B2 | 10/2012 | Prahlad et al. | |
| 8,306,931 B1 | 11/2012 | Bowman et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,392,677 B2 | 3/2013 | Bunte et al. | |
| 8,401,982 B1 | 3/2013 | Satish et al. | |
| 8,413,244 B1 | 4/2013 | Nachenberg | |
| 8,417,908 B2 | 4/2013 | Retnamma et al. | |
| 8,429,425 B2* | 4/2013 | Ko et al. | G06F 11/1469 707/640 |
| 8,429,428 B2 | 4/2013 | Ignatius et al. | |
| 8,478,937 B2* | 7/2013 | Grube | G06F 11/10 711/114 |
| 8,510,573 B2 | 8/2013 | Muller et al. | |
| 8,538,020 B1 | 9/2013 | Miller | |
| 8,612,439 B2 | 12/2013 | Prahlad et al. | |
| 8,751,828 B1* | 6/2014 | Raizen | G06F 21/6218 380/278 |
| 9,208,348 B1* | 12/2015 | Brennan | G06F 21/6209 |
| 9,367,702 B2 | 6/2016 | Erofeev et al. | |
| 2003/0046572 A1 | 3/2003 | Newman et al. | |
| 2004/0181689 A1 | 9/2004 | Kiyoto et al. | |
| 2004/0210539 A1 | 10/2004 | Ikeda et al. | |
| 2004/0218804 A1 | 11/2004 | Affleck et al. | |
| 2005/0027999 A1 | 2/2005 | Pelly et al. | |
| 2005/0091655 A1 | 4/2005 | Probert et al. | |
| 2005/0108526 A1 | 5/2005 | Robertson | |
| 2005/0180573 A1 | 8/2005 | Pelly et al. | |
| 2005/0246510 A1 | 11/2005 | Retnamma et al. | |
| 2005/0257062 A1 | 11/2005 | Ignatius et al. | |
| 2006/0034459 A1 | 2/2006 | Uchikawa | |
| 2006/0120520 A1 | 6/2006 | Suzuki et al. | |
| 2006/0224846 A1 | 10/2006 | Amarendran et al. | |
| 2006/0232826 A1* | 10/2006 | Bar-El | G06F 21/6218 358/403 |
| 2006/0242296 A1 | 10/2006 | Woolard et al. | |
| 2007/0057958 A1 | 3/2007 | Bucher et al. | |
| 2007/0100913 A1* | 5/2007 | Sumner | G06F 11/1453 |
| 2007/0240217 A1 | 10/2007 | Tuvell et al. | |
| 2007/0245108 A1 | 10/2007 | Yasaki et al. | |
| 2008/0005380 A1 | 1/2008 | Kawasaki et al. | |
| 2008/0037777 A1 | 2/2008 | Ignatius et al. | |
| 2008/0091747 A1 | 4/2008 | Prahlad et al. | |
| 2008/0091894 A1 | 4/2008 | Retnamma et al. | |
| 2008/0229037 A1 | 9/2008 | Bunte et al. | |
| 2008/0263355 A1 | 10/2008 | Witt et al. | |
| 2008/0320319 A1 | 12/2008 | Muller et al. | |
| 2009/0021403 A1 | 1/2009 | Chan et al. | |
| 2009/0031128 A1* | 1/2009 | French | G06F 21/6218 713/164 |
| 2009/0110198 A1 | 4/2009 | Garimella et al. | |
| 2009/0222907 A1 | 9/2009 | Guichard | |
| 2009/0319534 A1 | 12/2009 | Gokhale | |
| 2010/0031017 A1 | 2/2010 | Gokhale et al. | |
| 2010/0235649 A1* | 9/2010 | Jeffries | G06F 21/6209 713/189 |
| 2010/0287383 A1* | 11/2010 | Conte | G06F 21/577 713/189 |
| 2010/0299490 A1 | 11/2010 | Attarde et al. | |
| 2010/0306175 A1 | 12/2010 | Johnson et al. | |
| 2010/0313039 A1 | 12/2010 | Ignatius et al. | |
| 2010/0332479 A1 | 12/2010 | Prahlad et al. | |
| 2010/0333116 A1* | 12/2010 | Prahlad | G06F 17/3002 719/328 |
| 2011/0037766 A1 | 2/2011 | Judy et al. | |
| 2011/0087851 A1 | 4/2011 | Retnamma et al. | |
| 2011/0271279 A1 | 11/2011 | Pate | |
| 2012/0072713 A1 | 3/2012 | Begum et al. | |
| 2012/0084523 A1 | 4/2012 | Littlefield et al. | |
| 2012/0150818 A1 | 6/2012 | Vijayan Retnamma et al. | |
| 2012/0150826 A1 | 6/2012 | Vijayan Retnamma et al. | |
| 2012/0166745 A1 | 6/2012 | Retnamma et al. | |
| 2012/0179656 A1 | 7/2012 | Bunte et al. | |
| 2012/0185691 A1 | 7/2012 | Begum et al. | |
| 2012/0198559 A1 | 8/2012 | Venkata Naga Ravi | |
| 2012/0218275 A1 | 8/2012 | Wu | |
| 2013/0086381 A1 | 4/2013 | Thomas et al. | |
| 2013/0097421 A1 | 4/2013 | Lim | |
| 2013/0179405 A1 | 7/2013 | Bunte et al. | |
| 2013/0198522 A1 | 8/2013 | Kohno et al. | |
| 2013/0311785 A1 | 11/2013 | Ignatius et al. | |
| 2014/0053002 A1 | 2/2014 | Muller et al. | |
| 2014/0053252 A1 | 2/2014 | Kelsey | |
| 2014/0090061 A1 | 3/2014 | Avasarala et al. | |
| 2014/0115329 A1 | 4/2014 | Sturonas et al. | |
| 2014/0245026 A1* | 8/2014 | Bates | G06F 3/065 713/190 |
| 2014/0281518 A1 | 9/2014 | Erofeev et al. | |
| 2014/0281519 A1 | 9/2014 | Erofeev et al. | |
| 2014/0281545 A1 | 9/2014 | Erofeev et al. | |
| 2014/0304524 A1 | 10/2014 | Gokhale et al. | |
| 2014/0325217 A1* | 10/2014 | Mori | G06F 21/6227 713/165 |
| 2015/0139559 A1 | 5/2015 | Smith | |
| 2015/0178660 A1 | 6/2015 | Nowak et al. | |
| 2016/0078245 A1 | 3/2016 | Amarendran et al. | |

FOREIGN PATENT DOCUMENTS

| | | |
|---|---|---|
| DE | 69415115.7 | 8/1999 |
| DE | 60020978.4 | 4/2006 |
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899652 | 3/1999 |
| EP | 0981090 | 2/2000 |
| EP | 1384135 | 1/2004 |
| GB | 2447361 | 9/2008 |
| JP | 4198050 | 12/2008 |
| JP | 4267443 | 5/2009 |
| WO | WO 95/13580 | 5/1995 |
| WO | WO 99/12098 | 3/1999 |
| WO | WO 2004/023317 | 3/2004 |
| WO | WO 2006/052872 | 5/2006 |

OTHER PUBLICATIONS

Cabrera, et al. "ADSM: A Multi-Platform, Scalable, Back-up and Archive Mass Storage System." Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

IBM Technical Disclosure Bulletin, vol. 24, No. 5, Oct. 1981 New York, US, pp. 2404-2406, K.L. Huff, "Data Set Usage Sequence Number".

Rosenblum et al., "The Design and Implementation of a Log-Structure File System," Operating System Review SIGPOPS, vol. 25, No. 5, May 1991, New York, US, pp. 1-15.

(56) References Cited

OTHER PUBLICATIONS

Armstead et al., "Implementation of a Campus-Wide Distributed Mass Storage Service: The Dream vs. Reality," IEEE, 1995, pp. 190-199.

Gait, "The Optical File Cabinet: A Random-Access File system for Write-Once Optical Disks," IEEE Computer, vol. 21, No. 6, pp. 11-22 (1988).

Jander, "Launching Storage-Area Net," Data Communications, US, McGraw Hill, NY, vol. 27, No. 4(Mar. 21, 1998), pp. 64-72.

* cited by examiner

US 9,483,655 B2

FILE BACKUP WITH SELECTIVE ENCRYPTION

RELATED APPLICATION

This application claims the benefit of priority under 35 U.S.C. §119(e) of U.S. Provisional Patent Application No. 61/777,195, filed on Mar. 12, 2013, and entitled "DATA LEAK PROTECTION," the disclosure of which is hereby incorporated by reference in its entirety. Further, this application is related to the following applications that were filed on Sep. 30, 2013, the same date as the present application, and which are hereby incorporated by reference in their entirety herein: U.S. application No. 14/042,061 titled "AUTOMATIC FILE ENCRYPTION"; U.S. application No. 14/042,062 titled "ENCRYPTED FILE PRESENTATION"; U.S. application No. 14/042,076 titled "AUTOMATIC FILE DECRYPTION"; U.S. application No. 14/042,106 titled "MULTI-TIER FILE RESTORATION"; U.S. application No. 14/042,216 titled "MULTI-LAYER EMBEDDED ENCRYPTION; and U.S. application Ser. No. 14/042,173 titled "ENCRYPTED FILE BACKUP."

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

For many users, maintaining the security of electronic data is an ever-increasing concern and is growing ever more expensive. Preventing the leakage of data is of particular importance to enterprise users who often have access to private customer data, including financial information (e.g., social security numbers, credit card data, etc.). The challenges related to maintaining data security has continued to increase as more and more enterprise users utilize mobile devices to store and/or access data within an enterprise environment, and outside of the enterprise environment.

Today, to help protect data and to increase the accessibility of the data both throughout the enterprise environment and outside of the enterprise environment, many users and organizations store data on secondary storage devices or on a device in a network (e.g., cloud storage devices). In many cases, the data is encrypted on the secondary storage device.

Although data is more secure when stored in an encrypted form on the secondary storage device, securing the data on the secondary storage device does not prevent malicious users from accessing sensitive data on a primary storage device (e.g., a client computing device).

SUMMARY

For purposes of summarizing the disclosure, certain aspects, advantages and novel features of the inventions have been described herein. It is to be understood that not necessarily all such advantages may be achieved in accordance with any particular embodiment of the inventions disclosed herein. Thus, the inventions disclosed herein may be embodied or carried out in a manner that achieves or optimizes one advantage or group of advantages as taught herein without necessarily achieving other advantages as may be taught or suggested herein.

Certain embodiments described herein include a method for automatically encrypting files. In some cases, the method may be performed by computer hardware comprising one or more processors. The method can include detecting access to a first file, which may be stored in a primary storage system. Further, the method can include determining whether the access comprises a write access. In response to determining that the access comprises a write access, the method can include accessing file metadata associated with the first file and accessing a set of encryption rules. In addition, the method can include determining whether the file metadata satisfies the set of encryption rules. In response to determining that the file metadata satisfies the set of encryption rules, the method can include encrypting the first file to obtain a first encrypted file and modifying an extension of the first encrypted file to include an encryption extension.

In some embodiments, a system for automatically encrypting files is disclosed. The system can include a primary storage system configured to store a first file. In addition, the system can include a file monitor comprising computer hardware and configured to detect access to the first file and to determine whether the access comprises a write access. Further, the system can include an encryption rules repository configured to store encryption rules. In addition, the system can include an encryption rules engine comprising computer hardware and configured to access file metadata associated with the first file in response to the file monitor determining that the access comprises a write access. The encryption rules engine may be further configured to access a set of encryption rules from the encryption rules repository and to determine whether the file metadata satisfies the encryption rules. Moreover, the system may include an encryption module comprising computer hardware and configured to encrypt the first file to obtain a first encrypted file in response to the encryption rules engine determining that the file metadata satisfies the encryption rules. Further, the encryption module may be configured to modify an extension of the first encrypted file to include an encryption extension. In some cases, the computer hardware may include multiple computing devices.

In certain embodiments, a method for displaying encrypted files is disclosed. In some cases, the method may be performed by computer hardware comprising one or more processors. The method can include accessing an encrypted file, which may be an encrypted version of an unencrypted file. The unencrypted file may have an extension that is different than an extension of the encrypted file. Further, the method may include accessing metadata associated with the encrypted file and determining a file type of the file based, at least in part, on the metadata. In addition, the file can include outputting for display a reference to the encrypted file based, at least in part, on the file type. The reference to the encrypted file may be configured to mimic, at least in part, the extension of the unencrypted file.

Some embodiments of the present disclosure can include a method for displaying encrypted files, which, in some cases, may be performed by computer hardware comprising one or more processors. This method can include accessing an encrypted file that may be an encrypted version of a file. Further, the method can include accessing metadata associated with the encrypted file and determining a file type of the file based, at least in part, on the metadata. In addition, the method may include outputting for display a reference to the encrypted file based, at least in part, on the file type. This reference to the encrypted file may be configured to mimic, at least in part, a reference to the file.

Certain embodiments of the present disclosure include a system for displaying encrypted files. The system can include a display screen configured to output a user interface and an interface agent comprising computer hardware. The interface agent may be configured to access an encrypted file. The encrypted file may be an encrypted version of an unencrypted file, which may include an extension that is different than an extension of the encrypted file. Further, the interface agent may be configured to access metadata associated with the encrypted file and determine a file type of the file based, at least in part, on the metadata. Moreover, the interface agent may be configured to output for display on the display screen a reference to the encrypted file based, at least in part, on the file type. The reference to the encrypted file may be configured to mimic, at least in part, the extension of the unencrypted file.

In some embodiments, a method for automatically decrypting files is disclosed. The method, in some cases, may be performed by computer hardware comprising one or more processors. In some instances, the method can include authenticating a user based, at least in part, on authentication information provided by the user. The method may further include receiving a request to access a file stored in primary storage and determining based, at least in part, on a file extension of the file whether the file is an encrypted file. In some instances, the encrypted file comprises a modified file extension indicating that the encrypted file is encrypted. Further, in some instances, a reference to the file is displayed to the user as an unencrypted file regardless of whether the file is encrypted. In response to determining that the file is an encrypted file, the method can include determining whether the user is authorized to access the file based, at least in part, on the authentication information without prompting the user for the authentication information in response to the request to access the file. In response to determining that the user is authorized to access the file, the method may include decrypting the file to obtain a decrypted file and providing the user with access to the decrypted file.

In certain embodiments of the present disclosure, a system for automatically decrypting files is disclosed. The system can include an authentication system comprising computer hardware and configured to authenticate a user based, at least in part, on authentication information provided by the user. Further, the system may include a primary storage configured to store encrypted files and unencrypted files, and a secure file access module comprising computer hardware and configured to receive a request to access a file stored in the primary storage. The secure file access module may be further configured to determine based, at least in part, on a file extension of the file whether the file is an encrypted file. The encrypted file may include a modified file extension indicating that the encrypted file is encrypted. In some cases, a reference to the file is displayed to the user as an unencrypted file regardless of whether the file is encrypted. In addition, the secure file access module may be configured to determine whether the user is authorized to access the file based, at least in part, on the authentication information without prompting the user for the authentication information in response to the request to access the file. The system may further include a decryption module comprising computer hardware and configured to decrypt the file to obtain a decrypted file in response to the secure file access module determining that the file is an encrypted file and the user is authorized to access the file. In addition, the system can include an interface agent comprising computer hardware and configured to provide the user with access to the decrypted file obtained by the decryption module in response to the secure file access module determining that the file is an encrypted file and the user is authorized to access the file.

Some embodiments of the present disclosure include a method for backing up a file, which may be performed by a computing system comprising one or more processors. The method can include receiving, at a media agent, a command from a storage manager to backup a file at a secondary storage device. Further, the method can include receiving the file from a data agent and determining whether the file is an encrypted file. In response to determining that the file is an encrypted file, the method can include identifying an encryption algorithm used to encrypt the file and storing metadata associated with the file. The metadata may include an identity of the encryption algorithm. Further, the method may include storing the file at the secondary storage device without performing an encryption process. In response to determining that the file is not an encrypted file, the method can include encrypting the file to obtain an encrypted file and storing the encrypted file at the secondary storage device.

Certain embodiments of the present disclosure include a system for backing up a file. The system can include a primary storage device configured to store a set of files and a secondary storage device configured to store a backup of a file from the set of files. Further, the system can include a storage manager comprising computer hardware and configured to initiate the backup of the file. Initiating the backup of the file can include sending a first backup command to a data agent. In addition, the system can include a data agent comprising computer hardware and configured to provide the file to the media agent based, at least in part, to receiving the first backup command. Moreover, the system can include a media agent comprising computer hardware and configured to receive the file from the data agent and determine whether the file is an encrypted file. In response to determining that the file is an encrypted file, the media agent may store the file at the secondary storage device without performing an encryption process. Further, in response to determining that the file is not an encrypted file, the media agent may encrypt the file to obtain an encrypted file and store the encrypted file at the secondary storage device.

In some embodiments, a method for restoring a file from secondary storage is disclosed. This method, in some cases, may be performed by a computing system comprising one or more processors. In some instances, the method includes receiving, at a media agent, a command from a storage manager to restore a file from a secondary storage device to a recipient system. Further, the method may include accessing the secondary storage device to retrieve the file and accessing metadata associated with the file. In addition, the method may include determining based, at least in part, on the metadata whether the file was encrypted by the media agent. In response to determining that the media agent encrypted the file, the method can include decrypting the file to obtain an unencrypted file and providing the recipient system with access to the unencrypted file.

In certain embodiments, a system for restoring a file from secondary storage is disclosed. This system can include a secondary storage device configured to store a backup of a file. In some instance, the backup of the file is an encrypted file. Further, the system can include a storage manager comprising computer hardware and configured to initiate the restoration of the file. Initiating the restoration of the file can include sending a restore command to a media agent. Moreover, the system can include a media agent comprising computer hardware and configured to retrieve the file from the secondary storage device in response to receiving the restore command. The media agent may also access metadata associated with the file and determine based, at least in part, on the metadata whether the file was encrypted by the media agent. In response to determining that the media agent encrypted the file, the media agent may decrypt the file to obtain an unencrypted file and provide a recipient system with access to the unencrypted file.

Some embodiments of the present disclosure include a method for restoring a file from secondary storage. This method, in some cases, may be performed by a computing system comprising one or more processors. In some instances, the method includes receiving, at a media agent, a command from a storage manager to restore a file from a secondary storage device to a recipient system. Further, the method may include accessing the secondary storage device to retrieve the file and accessing metadata associated with the file. In addition, the method may include determining based, at least in part, on the metadata whether the file is encrypted. In response to determining that the file is encrypted, the method can include modifying the file to mimic, at least in part, an unencrypted version of the file without decrypting the file and providing the recipient system with access to the modified file.

Certain embodiments of the present disclosure include a system for restoring a file from secondary storage. The system can include a secondary storage device configured to store a backup of a file. In some cases, the backup of the file is an encrypted file. Further, the system can include a storage manager comprising computer hardware and configured to initiate the restoration of the file. Initiating the restoration of the file can include sending a restore command to a media agent. In addition, the system can include a media agent comprising computer hardware and configured to retrieve the file from the secondary storage device in response to receiving the restore command. Moreover, the media agent may be configured to access metadata associated with the file and to determine based, at least in part, on the metadata whether the file is encrypted. In response to determining that the file is encrypted, the media agent may be configured to modify the file to mimic, at least in part, an unencrypted version of the file without decrypting the file. Further, the media agent may be configured to provide a recipient system with access to the modified file.

In certain embodiments of the present disclosure, a method for automatically encrypting files is disclosed. The method may be performed by a computing system comprising one or more processors. In some cases, in response to determining that file metadata associated with a file stored in a primary storage system satisfies a set of encryption rules, the method includes encrypting the file to obtain an encrypted file and modifying an extension of the encrypted file to include an encryption extension. Encrypting the file comprises obtaining a data encryption key and encrypting the file with the data encryption key to obtain the encrypted file. Further, encrypting the file includes identifying a set of users who are authorized to access the file. For each user from the set of users, encrypting the file further includes encrypting a copy of the data encryption key for the user to obtain an encrypted copy of the data encryption key and embedding the encrypted copy of the data encryption key with the encrypted file.

In some embodiments of the present disclosure, a system is presented for automatically encrypting files. The system can include a primary storage system configured to store a file and an encryption rules system comprising computer hardware and configured to store a set of encryption rules. Further, the system may include a data agent comprising computer hardware. The data agent may be is associated with a file system of the system. Further, the data agent may be configured to access the set of encryption rules from the encryption rules system and determine based, at least in part, on the set of encryption rules that the file is to be encrypted. In addition, the system can generate a data encryption key and encrypt the file with the data encryption key to obtain an encrypted file. In addition, the system may identify a set of users who are authorized to access the file. For each of the users from the set of users, the data agent may be further configured to encrypt a copy of the data encryption key for the user to obtain an encrypted copy of the data encryption key and include the encrypted copy of the data encryption key with the encrypted file.

In certain embodiments of the present disclosure, a method is presented for backing up a primary storage system. The method may be performed by a computing system comprising one or more processors. The method may include identifying a file stored at a primary storage system for backup to a secondary storage system and determining whether the file is an encrypted file. In response to determining that the file is an encrypted file, the method may include extracting an encrypted data encryption key from the file and decrypting the encrypted data encryption key to obtain a data encryption key. Moreover, the method may include decrypting the file using the data encryption key to obtain a decrypted file and providing the decrypted file to the secondary storage system for backup, thereby enabling the secondary storage system to more efficiently store files at the secondary storage system.

Some embodiments of the present disclosure describe a system for backing up a primary storage system. The system can include a primary storage device configured to store a set of files and a data agent comprising computer hardware. The data agent may be configured to identify a file from the set of files for backup to a secondary storage system and to determine whether the file is an encrypted file. In response to determining that the file is an encrypted file, the data agent may be further configured to extract an encrypted data encryption key from the file and to decrypt the encrypted data encryption key to obtain a data encryption key. Further, the data agent may be configured to decrypt the file using the data encryption key to obtain a decrypted file and to provide the decrypted file to the secondary storage system for backup, thereby enabling the secondary storage system to more efficiently store files at the secondary storage system.

BRIEF DESCRIPTION OF THE DRAWINGS

Throughout the drawings, reference numbers are re-used to indicate correspondence between referenced elements.

The drawings are provided to illustrate embodiments of the inventive subject matter described herein and not to limit the scope thereof.

DETAILED DESCRIPTION

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
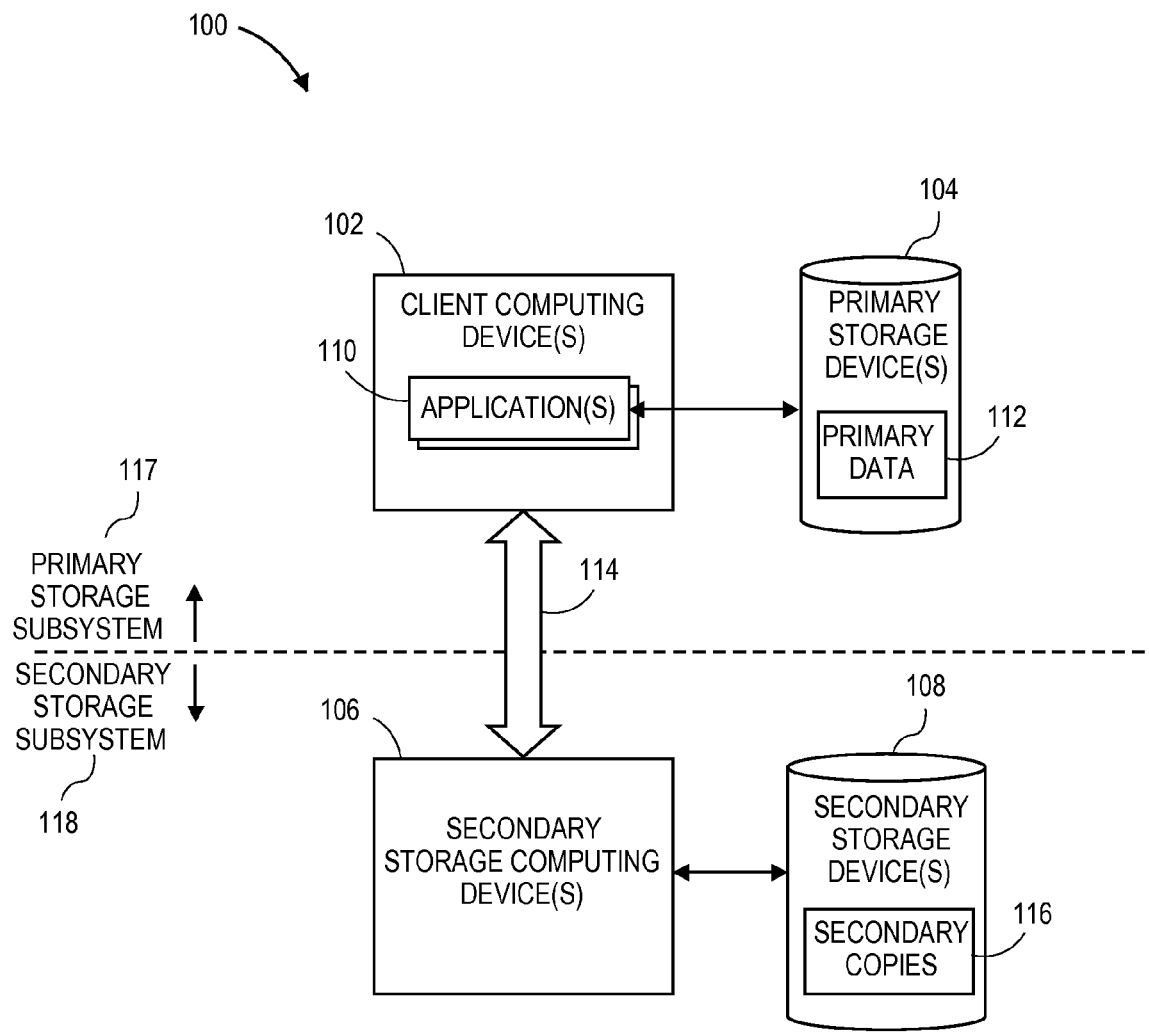
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 8,285,681, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0319534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION"

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLS]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as or information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Cops

Figure 1B:
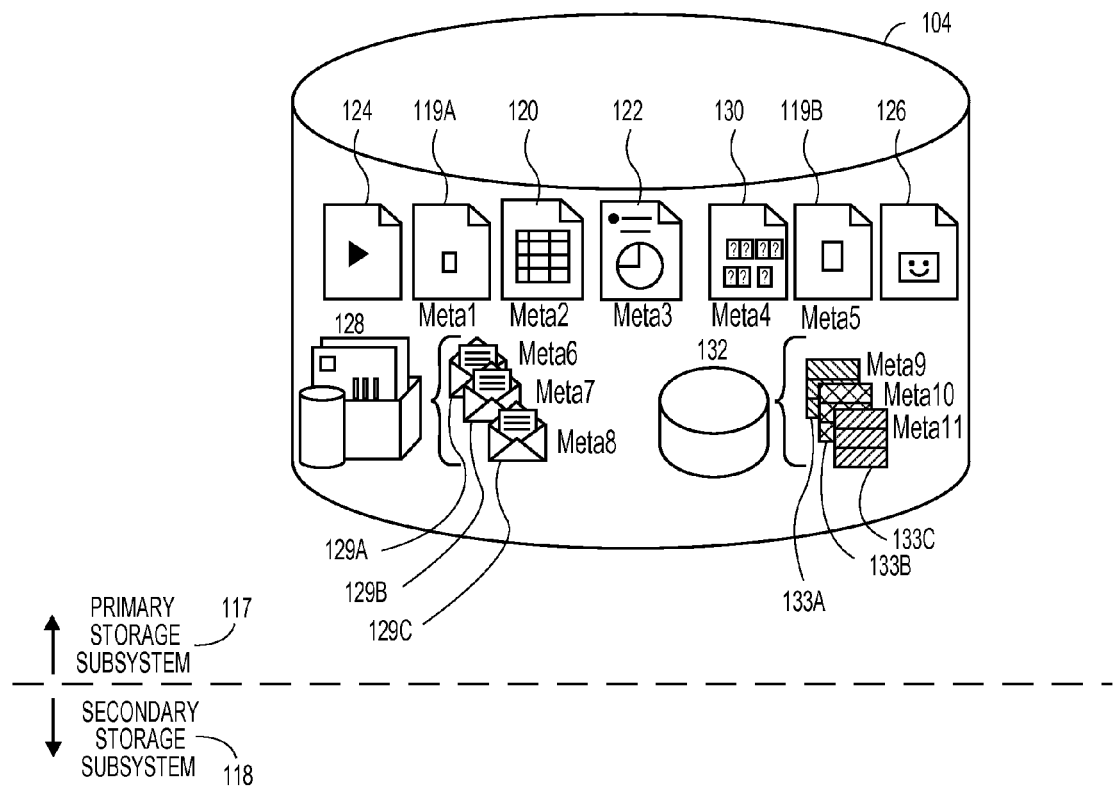
FIG. 1B is a detailed view of a primary storage device, a secondary storage device, and some examples of primary data and secondary copy data.
Figure 1B:
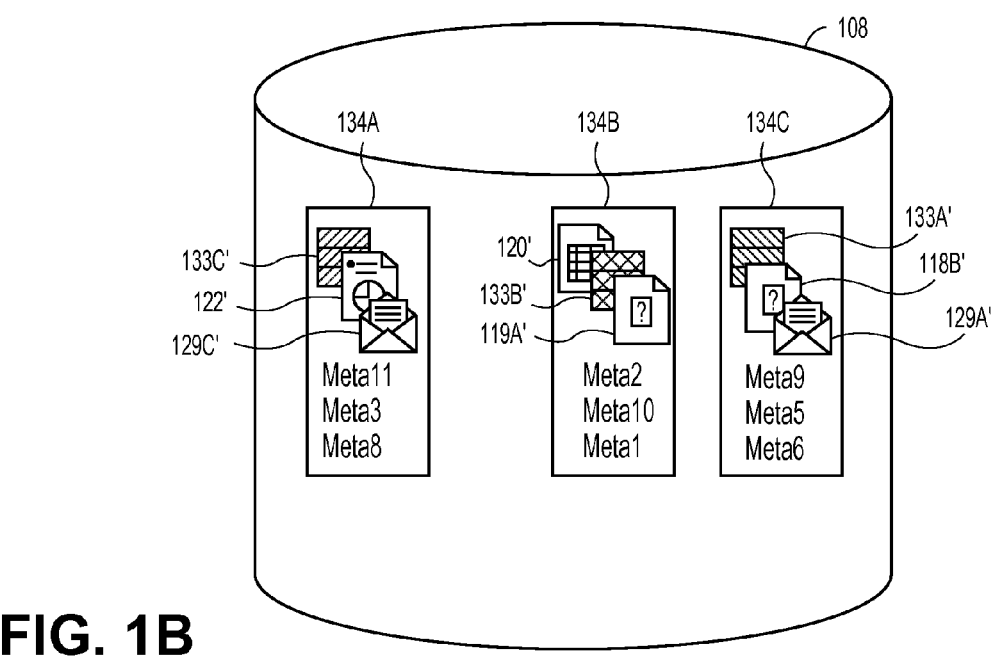

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Metal-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
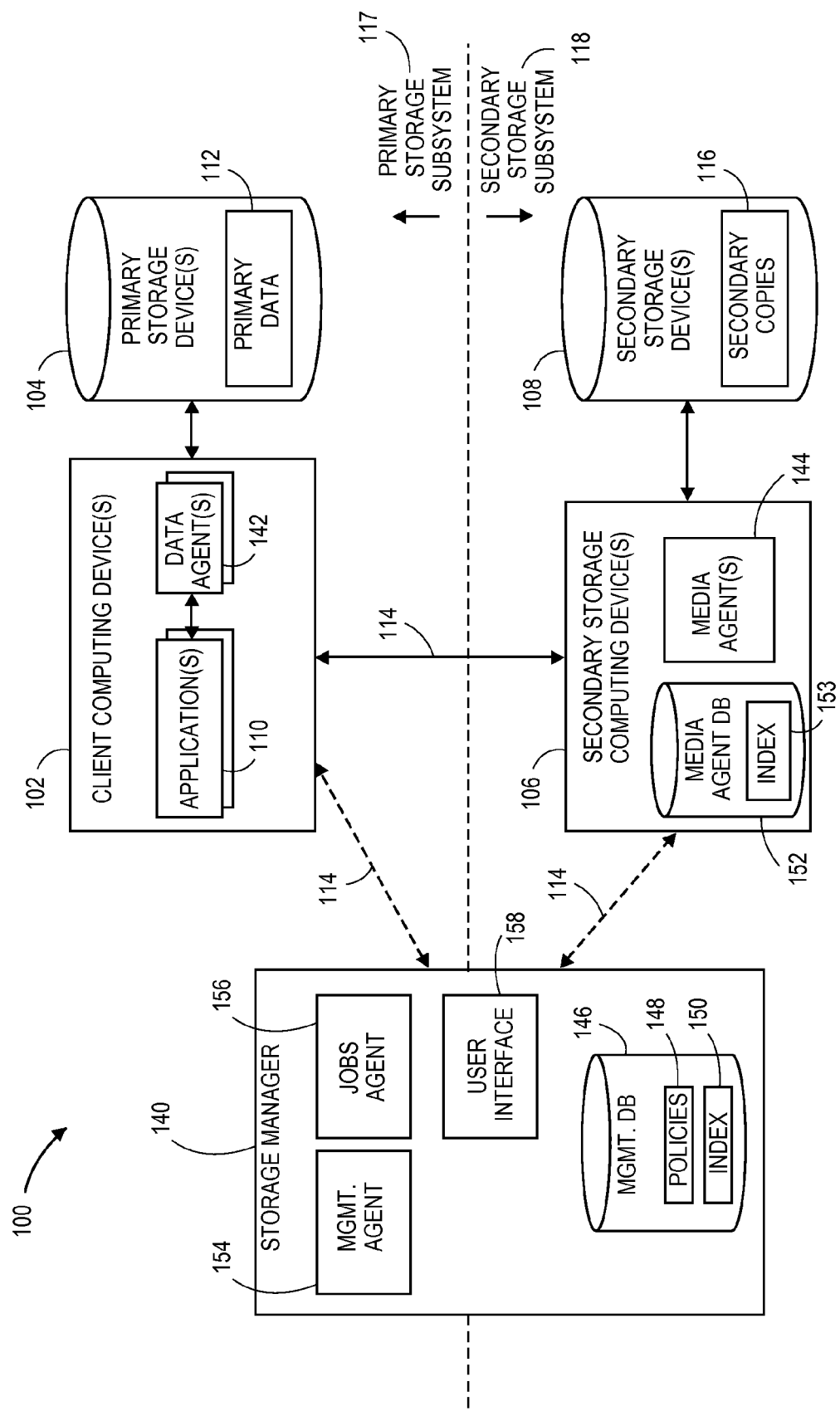
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108, Storage Manager As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
  initiating execution of secondary copy operations;
  managing secondary storage devices 108 and inventory/capacity of the same;
  allocating secondary storage devices 108 for secondary storage operations;
  monitoring completion of and providing status reporting related to secondary storage operations;
  tracking age information relating to secondary copies 116, secondary storage devices 108, and comparing the age information against retention guidelines;
  tracking movement of data within the information management system 100;
  tracking logical associations between components in the information management system 100;
  protecting metadata associated with the information management system 100; and
  implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. Nos. 7,747,579 and 7,343,453, which are incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 by even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
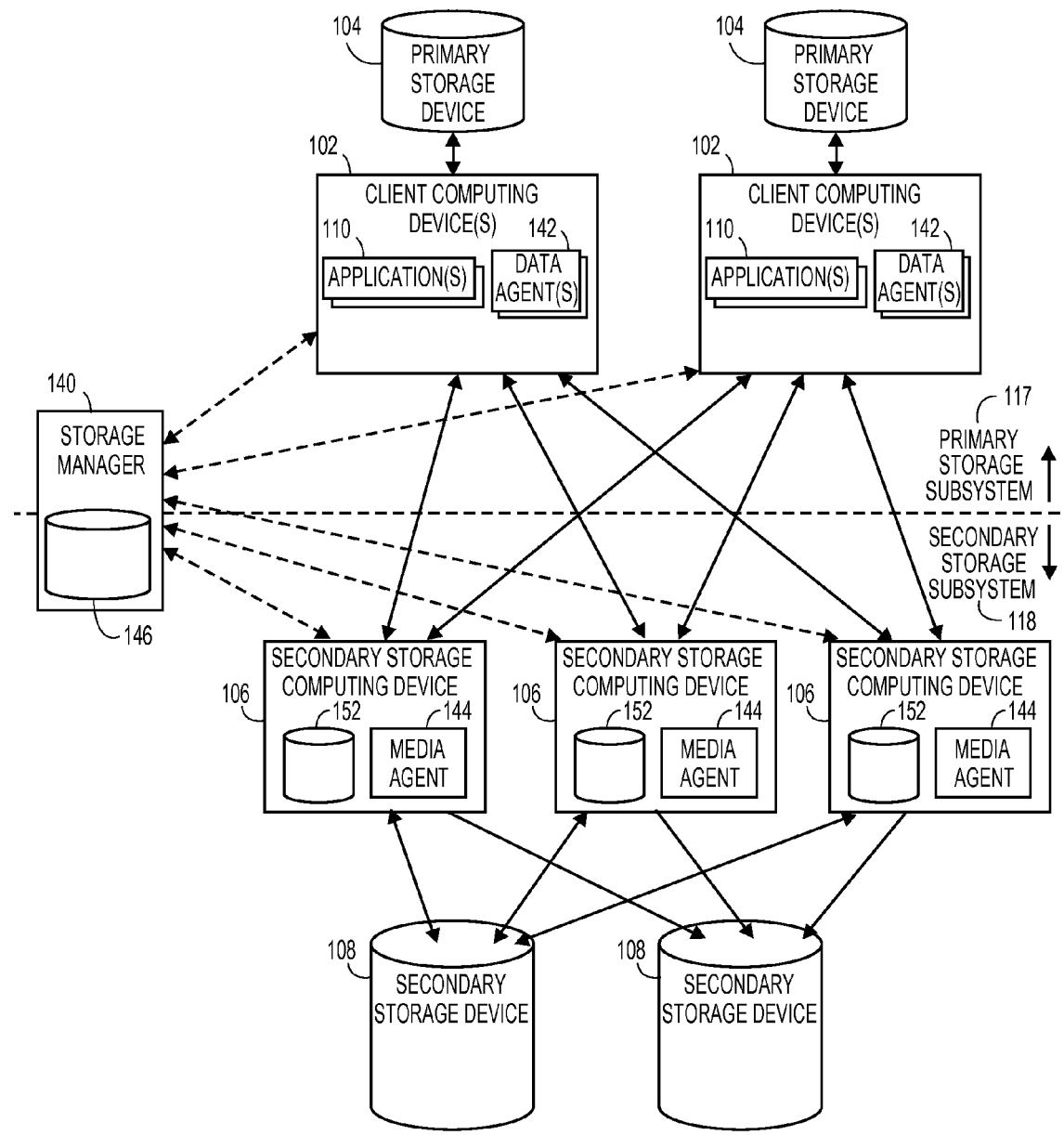
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant"

image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "subclients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
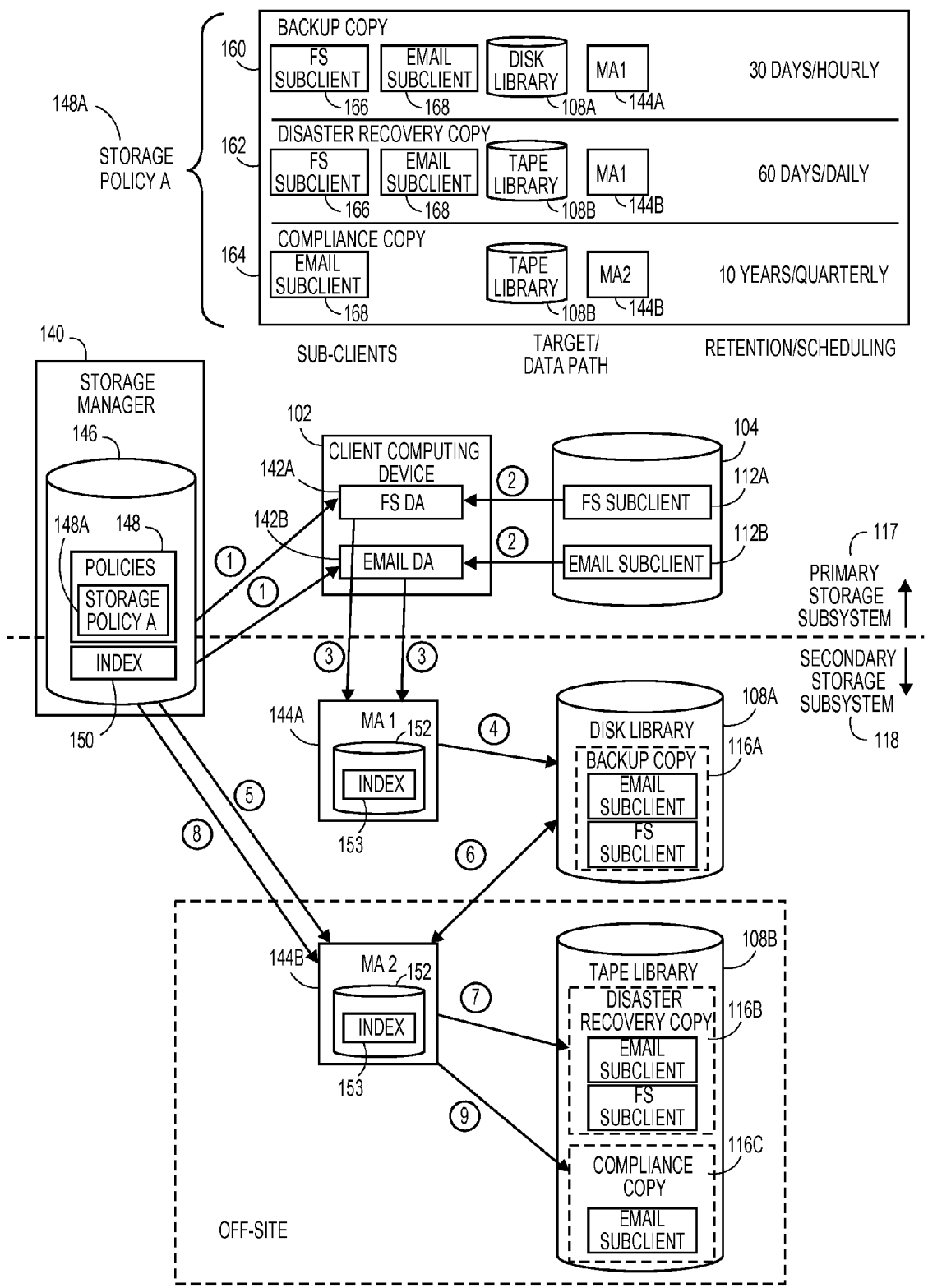
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis, Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30-day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

Example Client Computing Environment

Figure 2:
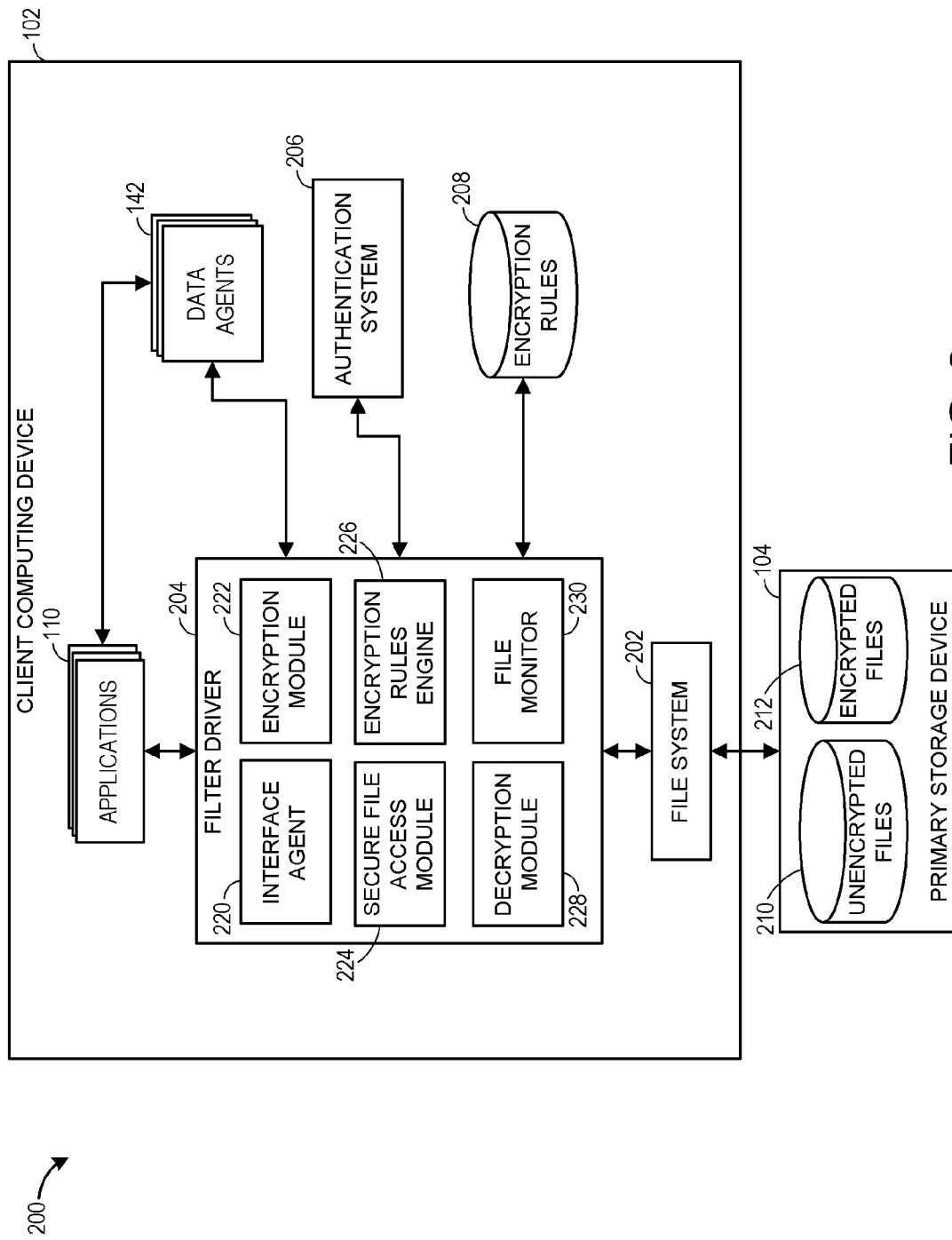
FIG. 2 is a block diagram illustrating an example of a client computing environment including a client computing device and a primary storage device.

FIG. 2 is a block diagram illustrating an example of a client computing environment 200 including a client computing device 102 and a primary storage device 104. As previously described, for example with respect to FIG. 1C, the client computing device 102 may include one or more applications 110 and one or more data agents 142. At least some of the data agents 142 may correspond to one or more of the applications 110 and, as previously described, may facilitate data operations with respect to the corresponding application(s). Further, one or more of the data agents 142 may facilitate managing and/or interacting with a file system 202 of the client computing device 102. This file system 202 may include any type of file system that can be used by a client computing device 102. For example, the file system 202 may include a Microsoft Windows file system (e.g., FAT, NTFS, etc.), a Linux based file system, a Unix based file system, an Apple Macintosh file system (e.g., HFS Plus), and the like. In some instances, the client computing device 102 may include multiple file systems 202 of the same type or of a different type.

In addition to the previously described systems, the client computing device 102 may include a filter driver 204 that can interact with data (e.g., production data) associated with the applications 110. For instance, the filter driver 204 may comprise a file system filter driver, an operating system driver, a filtering program, a data trapping program, an application, a module of one or more of the applications 110, an application programming interface ("API"), or other like software module or process that, among other things, monitors and/or intercepts particular application requests targeted at a file system, another file system filter driver, a network attached storage ("NAS"), a storage area network ("SAN"), mass storage and/or other memory or raw data. In some embodiments, the filter driver 204 may reside in the I/O stack of an application 110 and may intercept, analyze and/or copy certain data traveling to or from the application 110 from or to a file system.

In certain embodiments, the filter driver 204 may intercept data modification operations that include changes, updates and new information (e.g., data writes) with respect to the application(s) 110 of interest. For example, the filter driver 204 may locate, monitor and/or process one or more of the following with respect to a particular application 110, application type, or group of applications: data management operations (e.g., data write operations, file attribute modifications), logs or journals (e.g., NTFS change journal), configuration files, file settings, control files, other files used by the application 110, combinations of the same or the like. In certain embodiments, such data may also be gathered from files across multiple storage systems within the client computing device 102. Furthermore, the filter driver 204 may be configured to monitor changes to particular files, such as files identified as being associated with data of the applications 110.

In certain embodiments, multiple filter drivers 204 may be deployed on a computing system, each filter driver being dedicated to data of a particular application 110. In such embodiments, not all information associated with the client computing system 102 may be captured by the filter drivers 204 and thus, the impact on system performance may be reduced. In other embodiments, the filter driver 204 may be suitable for use with multiple application types and/or may be adaptable or configurable for use with multiple applications 110. For example, one or more instances of customized or particularizing filtering programs may be instantiated based on application specifics or other needs or preferences.

The filter driver 204 may include a number of modules or subsystems that can facilitate performing various operations with respect to the applications 110 and/or file system 202. For example, the filter driver 204 may include a number of modules or subsystems to facilitate encrypting data and/or files. As a second example, the filter driver 204 may include modules or subsystems to facilitate presenting encrypted files to an authorized user. In certain embodiments, the modules or subsystems of the filter driver 204 can include one or more of the following: an interface agent 220, an encryption module 222, a secure file access module 224, an encryption rules engine 226, a decryption module 228, and a file monitor 230.

Using the file monitor 230, the filter driver 204 can monitor a user's interaction with a file. This interaction can include accessing the file via the file system 202, one or more applications 110, one or more data agents 142, or through any other method of accessing or interacting with a file. In some cases, the file monitor 230 may be configured to identify when a file is modified and/or created. Monitoring the creation of a file can include identifying a "new" file operation, a "save as" operation, a "copy" operation, or any other operation that can result in a new file or a new copy of an existing file.

The encryption rules engine 226 can include any system configured to determine whether a file is to be encrypted. Generally, the file monitor 230 is configured to trigger the encryption rules engine 226 determining whether a file is to be encrypted. For example, the encryption rules engine 226 may determine whether to encrypt a file in response to the file monitor 230 detecting a write access to the file, or a file creation operation (e.g., a "new" operation, a "save as" operation, etc.) that results in the creation of the file. Alternatively, the encryption rules engine 226 may determine whether a file is to be encrypted each time the file is accessed regardless of the type of file access. In other cases, the encryption rules engine 226 may determine whether a file should be encrypted in response to a command received from another system, such as a data agent 142 or the storage manager 140.

Determining whether to encrypt a file can be based on a set of encryption rules. In some instances, these encryption rules may be included with the encryption rules engine 226. Alternatively, or in addition, the encryption rules may be stored at an encryption rules repository 208 that is accessible by the filter driver 204 and/or the encryption rules engine 226 of the filter driver 204. The encryption rules can include any rule for determining whether a file is to be encrypted. These encryption rules may be based on one or more users and/or pieces of metadata associated with the file.

For example, an encryption rule may be based on one or more of the following: the author of a file, the owner of a file, the editor of a file, the type of file, the location of the file, the name of the file, the age of the file, a tag associated with the file, whether the file and/or a version of the file was previously encrypted, keywords associated with the file name and/or the contents of the file, and the like. Unless stated otherwise, the phrase "a version of the file" as used herein generally refers to the file and/or a copy of the file that includes different content than the file currently being evaluated (e.g., an older copy of the file, a pre-edited version of a file, etc.).

In some cases, the characteristics of a file used to determine whether to encrypt a file may be weighted. For example, the type of the file may be weighted such that it has a greater affect in determining whether to encrypt a file than the author of the file.

Once the encryption rules engine 226 determines that a file should be encrypted, the encryption module 222 can encrypt the file using an encryption algorithm. In some cases, the encryption algorithm may be specified as part of an encryption rule. Once the file has been encrypted, the encryption module 222 may delete any unencrypted copies of the file located on the client computing device 102 and/or the primary storage device 104. Further, in some cases, the encryption module 222 may cause a cached copy of the file to be locked or inaccessible to prevent access to unencrypted copies or fragments of a file that has been identified for encryption by the encryption rules engine 226.

As stated above, the filter driver 204 may include an interface agent 220. The interface agent 220 may be configured to control how files, or references to files (e.g., file names, file icons, etc.), are displayed to a user. In some cases, the interface agent 220 can control how files are displayed in a variety of display locations, such as in a window, in a listing of files, on a desktop display, in an application window or viewer, etc.

Further, in some cases, the interface agent 220 may be configured to present encrypted files as if the files were unencrypted. Further, the interface agent 220 may be configured to present files differently based on the user accessing the client computing device 102 as determined by a user identifier and/or authentication information obtained via an authentication system 206. For example, an administrator may see the encryption status of a file via an annotation on an icon or a special file extension. However, the interface agent 220 may cause all files to appear as unencrypted files to a non-administrator user. Further, the interface agent 220 may cause at least some encrypted files to be hidden from view altogether for a user who does not have authorization to decrypt the hidden encrypted files.

When a user and/or application 110 attempts to access a file, the secure file access module 224 can determine whether the file is an encrypted file based on, for example, the file name. If the file is not encrypted, the file access operation is provided to the file system 202 for processing. If the file is encrypted, the secure file access module 224 can determine whether to decrypt the file based on, for example, authentication information associated with the user.

Generally, the secure file access module 224 can access the authentication information that the authentication system 206 obtained when the user logged in to the client computing device 102. Advantageously, in certain embodiments, by using the authentication information provided at login, the request to access a file can be processed without the user being prompted with a request for authentication at the time the file is accessed. Thus, in some cases, the file access request may be processed without the user being made aware of the encryption status of the file.

In cases where the secure file access module 224 determines that a file is encrypted and that a user and/or application 110 is authorized to access the file, the secure file access module 224 can provide the encrypted file to a decryption module 228. The decryption module 228 can decrypt the file and provide the file to the application 110 for use or presentation to a user. In some cases, as will be described in more detail below, the decryption module 228 can determine the type of encryption used to encrypt the file and select a corresponding decryption algorithm to decrypt the file. Further, in cases where an asymmetric key was used to encrypt the file, the decryption module 228 can identify a public key corresponding to the private key used to encrypt the file. The decryption module 228 can then use the public key to decrypt the file.

As indicated above, the primary storage device 104 can store the unencrypted files. Further, the primary storage device 104 can also store encrypted files, which may be encrypted by the encryption module 222 or otherwise. As illustrated in FIG. 2, the primary storage device 104 can include an unencrypted files repository 210 configured to store unencrypted files and an encrypted files repository 212 configured to store encrypted files.

Although encrypted files and unencrypted files may be stored in different repositories of the primary storage device 104, the encrypted and unencrypted files may be presented to a user without differentiating between the encryption status of the files and the storage location of the file in the primary storage device 104. Alternatively, the encrypted files may be presented to a user in a separate location of a file storage display and/or with an indication of the encryption status of the file. Further, in some cases, the primary storage device 104 may be divided into a fewer or greater number of repositories, which may or may not be divided based on the encryption status of files stored by the primary storage device 104.

Generally, although not necessarily, a client computing device 102 includes an authentication system 206. This authentication system 206 can be configured to authenticate a user attempting to use the client computing device 102 and/or attempting to access files stored on the primary storage device 104. Further, in some cases, the authentication system 206 can provide authentication information to the secure file access module 224 to facilitate determining whether a user is authorized to access an encrypted file. In certain embodiments, the authentication system 206 may obtain additional authentication information from a user when the user attempts to access an encrypted file. This information can then be provided to the secure file access module 224. In other embodiments, the authentication system 206 provides previously obtained authentication information to the secure access module 224 and does not prompt a user for additional information when the user attempts to access an encrypted file.

Example of an Encryption Determination Process

Figure 3:
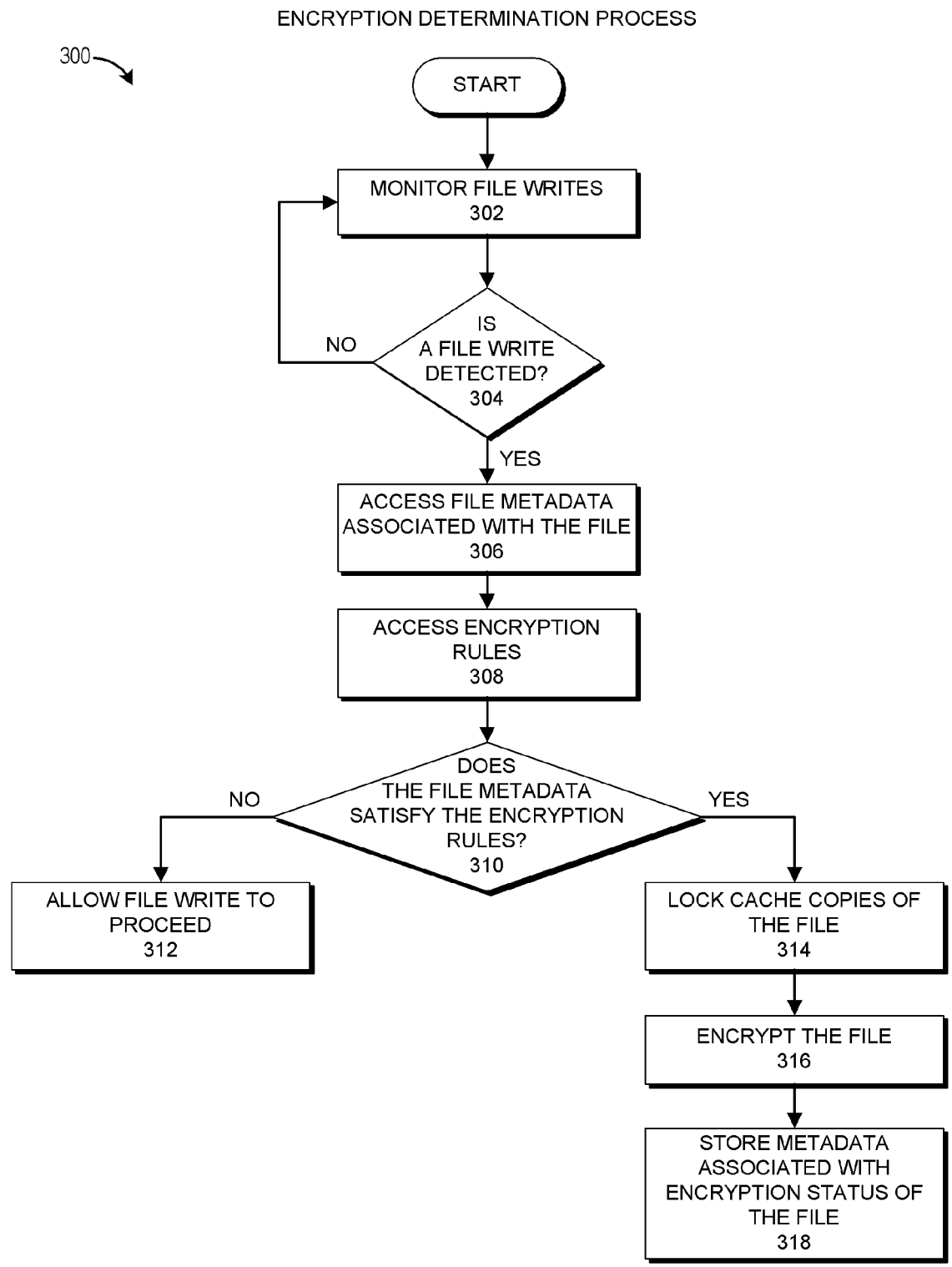
FIG. 3 illustrates an example embodiment of an encryption determination process.

FIG. 3 illustrates an example embodiment of an encryption determination process 300. The process 300 can be implemented, at least in part, by any system that can detect when a file is created or modified and can determine whether to encrypt the file based on a set of encryption rules. For example, the process 300, in whole or in part, can be implemented by the filter driver 204, the file monitor 230, the encryption rules engine 226, and the encryption module 222, to name a few. Although any number of systems, in whole or in part, can implement the process 300, to simplify discussion, portions of the process 300 will be described with reference to particular systems.

The process 300 begins at block 302 where, for example, the file monitor 230 monitors file access operations to detect file write operations. Typically, the file monitor 230 is monitoring file access operations for files stored at the primary storage device 104. However, in some cases, the file monitor 230 may monitor file access operations for files stored elsewhere, such as on a portable storage device (e.g., a USB key, an external disk drive, etc.). In some cases, the file write operations can include write commands, file create commands, file copy commands, or any commands or operations that can result in a file being modified or created, or that indicate that a file is being modified or created. For example, the file monitor 230 may detect a "New" command, a "Save" command, a "Save As" command, a "Copy" command, or any operations related to such commands. At decision block 304, the file monitor 230 determines whether a file write, or file creation, operation is detected with respect to a file. If not, the file monitor 230 continues to monitor operations at the block 302.

Generally, the operations monitored are commands received from the applications 110 and/or the data agents 142. However, in some cases, the file monitor 230 can monitor commands or operations received from any source that can access a file. For example, in some cases, commands may be received from a processor or an application-specific processor (not shown) that is included as part of the client computing device 110. As a second example, commands may be received from the storage manager 140 or a media agent 144.

At block 306, the encryption rules engine 226 accesses metadata, or file metadata, associated with the file. Alternatively, the file monitor 230 may access the metadata. In some cases, some of the metadata may be accessed and/or determined by the file monitor 230 and some of the metadata may be accessed and/or determined by the encryption rules engine 226. The metadata can include any type of data associated with the file, including data associated with users associated with the file. Further, the metadata can include any type of data related to the file that can be the basis, at least in part, of an encryption rule for determining whether to encrypt the file.

For example, the metadata can include: the name of the file, the file type of the file (e.g., a word processing file, a spreadsheet, a PDF file, a CAD file, an audio file, a video file, etc.), an author of the file, users who have authorization to access the file, one or more applications capable of reading or accessing the file (e.g., Microsoft Word, Microsoft Excel, Adobe Acrobat, Corel WinDVD, etc.), the location of the file within a file organization structure, the time the file was created, the time the file was last modified and/or accessed, the size of the file, and the like. In some cases, the metadata can include a designation and/or tag associated with the file. For example, an encryption determination may be made based on whether a user or application designated a file or set of files for encryption, either through explicit designation or by inclusion in a location (e.g., directory) that has been designated for encryption. As a second example, files that are designated for backup or for backup to a particular location or media may be designated for encryption.

The encryption rules engine 226 accesses one or more encryption rules at block 308 for determining whether to encrypt the file associated with the file write detected at the decision block 304. In some cases, the encryption rules are accessed from the encryption rules repository 208. In other cases, the encryption rules are included as part of the filter driver 204. Whether included with the filter driver, or stored at the encryption rules repository 208, the encryption rules may be provided by the storage manager 140, a user (e.g., an administrator), a provider of the filter driver 204, or any other user or entity that can provide encryption rules.

As described above, the encryption rules can include any rule for determining whether a file is to be encrypted. Typically, the encryption rules are based on the metadata associated with the file that the encryption rules engine 226 is analyzing to make an encryption determination. However, in some cases, the encryption rules may be based on alternative or additional factors, such as a user associated with the client computing device 102, the role of the client computing device 102, a location of the client computing device 102, and the like.

At decision block 310, the encryption rules engine 226 determines whether the file metadata, or at least a subset of the metadata, satisfies one or more of the encryption rules. In some cases, decision block 310 includes determining whether the alternative or additional factors described above satisfy one or more of the encryption rules. If the file metadata does not satisfy any of the encryption rules, the file write, and/or file creation, operation is allowed to proceed at block 312. In other words, the operation may be performed as if the filter driver 204 were not present or as if the blocks 302-310 were not performed. In some cases, the block 312 may include storing an unencrypted version of a previously encrypted file if the file previously satisfied an encryption rule, but no longer satisfies an encryption rule. In certain embodiments, the block 312 can include informing a user that an encryption rule is not satisfied and may present the user with an option to encrypt the file despite the file not satisfying one of the encryption rules.

If the encryption rules engine 226 determines that the file metadata does satisfy at least one of the encryption rules as the decision block 310, the filter driver 204 locks one or more cache copies of the file at block 314. Advantageously, in some embodiments, by locking cache copies of the file, users and/or applications are unable to access unencrypted versions or copies of the file. In some embodiments, the block 314 is optional.

At block 316, the encryption module 222 encrypts the file. In some cases, the encryption module 222 uses the same encryption algorithm to encrypt the file regardless of the encryption rule satisfied by the metadata and/or the file to be encrypted. In other cases, the encryption module 222 selects an encryption algorithm based on the encryption rule satisfied and/or the file to be encrypted. If multiple encryption rules are satisfied, the encryption module 222 may select the encryption algorithm based on a preference, weighting, ranking, or other factor associated with the satisfied encryption rules. In some embodiments, the block 316 includes deleting or rendering inaccessible unencrypted versions or copies of the file.

In some cases, the block 316 can include modifying an extension of the file or appending an addition extension to the file to indicate the encryption status of the file. For example, the encryption module 222 may change a file extension to .CVX to indicate the file is encrypted, Thus, in some cases, an encrypted PDF file X may be renamed from X.pdf to X.cvx. Alternatively, the encryption module 222 may append an encryption extension (e.g., .CVX) indicating the encryption status of the file after the file's unencrypted extension. Thus, in some cases, an encrypted PDF file Y may be renamed from Y.pdf to Y.pdf.cvx. The encrypted file may be stored at the location indicated by the command detected at the decision block 304. Alternatively, the encrypted file may be stored at an alternate location. This alternative location may be designated for encrypted files and/or may be designated by the encryption rule satisfied by the file.

The encryption module 222 stores metadata associated with the encryption status of the file at block 318. The metadata may be stored with the encrypted file or at another location. For example, the metadata may be stored at the primary storage device 104, with the file or in another location, and/or the metadata may be stored at the storage manager 140. The metadata can include information related to the encryption of the file. For example, the metadata can include the encryption status of the file, an identification of the encryption rule satisfied, an identification of the encryption algorithm used to encrypt the file, and the like. In some embodiments, the block 318 is optional.

Example of an Encrypted File Display Process

Figure 4:
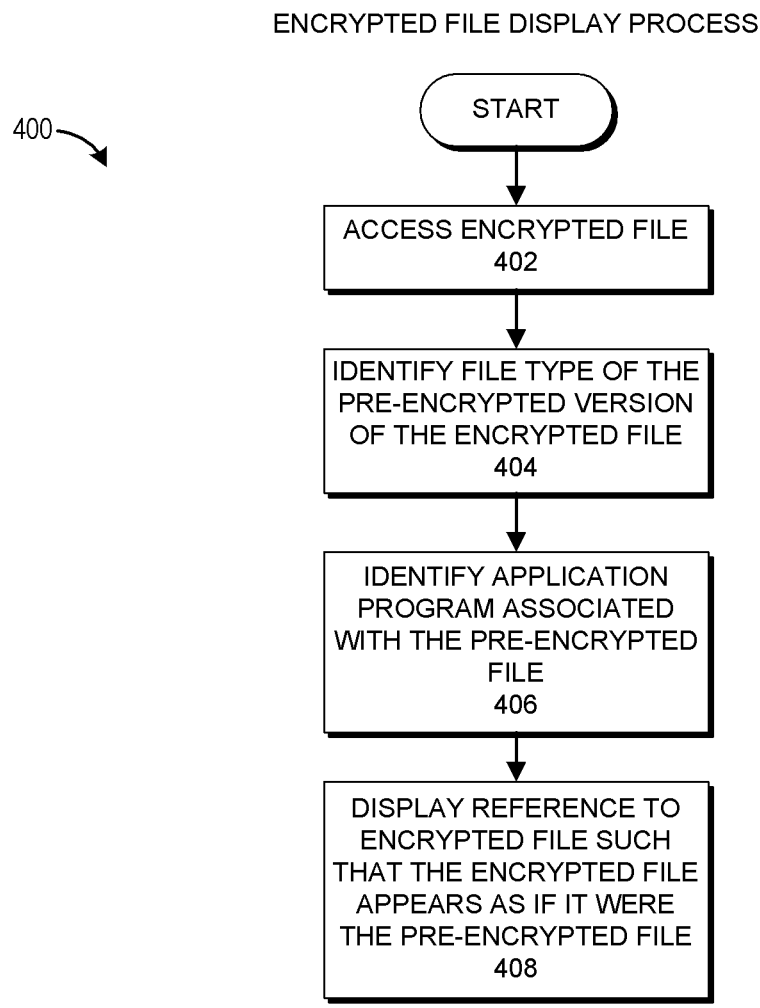
FIG. 4 illustrates an example embodiment of an encrypted file display process.

FIG. 4 illustrates an example embodiment of an encrypted file display process 400. The process 400 can be implemented, at least in part, by any system that can cause a reference or link to a file to be presented to a user. Further, the process 400 can be implemented by any system that can cause the reference or link to the file to be presented as a reference or link to an unencrypted file regardless of the encryption status of the file. For example, the process 400, in whole or in part, can be implemented by the filter driver 204, the interface agent 220, and the secure file access module 224, to name a few. Although any number of systems, in whole or in part, can implement the process 400, to simplify discussion, portions of the process 400 will be described with reference to particular systems.

The process 400 begins at block 402 where, for example, the interface agent 220 accesses an encrypted file. In some cases, the interface agent 220 may receive the encrypted file from the file system 202, an application 110, the primary storage device 104, a cache (not shown), a processor (not shown), or any other source that can provide the encrypted file to the interface agent 220. Alternatively, the interface agent 220 may scan a storage location (e.g., the primary storage device 104) to identify encrypted files at the block 402. In some embodiments, the process 400 may occur as part of an encryption process, such as the process 300. In such embodiments, the process 400, in whole or in part, may occur as part of the block 316 or subsequent to the block 316.

At block 404, the interface agent 220 identifies the file type of a pre-encrypted version or copy of the encrypted file. In other words, the interface agent 220 identifies the file type of the file (e.g., PDF file, spreadsheet file, word processing file, video file, audio file, image file, etc.) before the file was encrypted. The interface agent 220 may determine the file type based on a reference to the file. This reference generally refers to what is displayed to the user to identify the file or the existence of the file to the user. For example, the reference can include the name of the file, a file extension of the file, a link to the file, or an image or icon associated with the file, to name a few. Generally, but not necessarily, the file extension of the encrypted file differs from the file extension of the unencrypted file. Further, in some cases, the interface agent 220 may identify the file type based on metadata associated with the pre-encrypted file and/or the encrypted file.

The interface agent 220 identifies one or more application programs associated with the pre-encrypted version of the file at block 406. By identifying the application programs associated with the pre-encrypted version of the file, the interface agent 220 can, in some cases, cause the encrypted file to be associated with the same application programs. Further, the interface agent 220 can, in some cases, cause a reference to the encrypted file to include an icon or other identifying information that informs the user that the encrypted file is associated with an application that typically can access the non-encrypted version of the file.

With many proprietary file formats or types, there may exist only a single application associated with the file. However, in some cases (e.g., PDF files), multiple applications may be capable of accessing a particular file type and thus multiple applications may be associated with the pre-encrypted version of the file. In some cases, there may not exist an application associated with the file. For example, the application that created the file may have been removed from the client computing device 102, or the file may have been created on another computing device and then provided to the client computing device 102. In such cases, the interface agent 220 may still determine an application capable of accessing the pre-encrypted file based on metadata associated with the file and/or based on information available on a network. In other cases, the interface agent 220 may identify the file as being associated with an unknown file type. In some embodiments, the block 406 is optional.

At block 408, the interface agent 220 displays, or causes a display screen to display, a reference to the encrypted file that appears as if it were the reference to the unencrypted file. In other words, the reference to the encrypted file mimics, at least in part, a reference to the unencrypted file. Thus, in some cases, the reference to the encrypted file may have the same file name, file extension, icon or other file reference characteristic as a reference to the unencrypted file. Further, as described in more detail below, at least some of the metadata associated with the encrypted file may match at least some of the metadata associated with the unencrypted file thereby, in some cases, preventing a user and/or application from using the metadata to determine whether a file is encrypted.

Advantageously, in some embodiments, by displaying the reference to the encrypted file as if it were a reference to the unencrypted file, the file can be organized by the file system 202 and identified by a user with the same ease as if the file were not encrypted. In some cases, the user may not know whether the file is encrypted and can organize and access the file without knowing the encryption status of the file. Further, in some instances, the reference to the encrypted file may be based on a reference to the unencrypted file, but may or may not mimic the reference to the unencrypted file.

Moreover, the reference to the encrypted file may be similar to, but not identical to a reference to the unencrypted file. For example, the reference to the encrypted file may include an annotation, such as a mark on the icon of the encrypted file that indicates the encryption status of the file. This annotation of the icon can inform the user that the file is an encrypted version of the unencrypted file. In other cases, the icon of the encrypted file may be identical to the icon of the unencrypted file, but the file extension may differ. Advantageously, in some embodiments, by non-identically mimicking the reference to the unencrypted file, encrypted and unencrypted files can be organized together, but still be distinguishable. Further, the file types of the encrypted files can be identified as easily as if the files were unencrypted files while maintaining the ability for the user to distinguish between encrypted and unencrypted files by, for example, glancing at a reference to the file (e.g., the file icon or file name).

As previously described, in some implementations, the file extension of the encrypted file may differ from the file extension of the unencrypted file. For example, a .CVX extension may be appended to an existing file extension. In some such cases, the added or modified extension of the encrypted file may be hidden from view by default thereby, in some cases, displaying the original file extension or no file extension to the user.

Example of an Encrypted File Access Process

Figure 5:
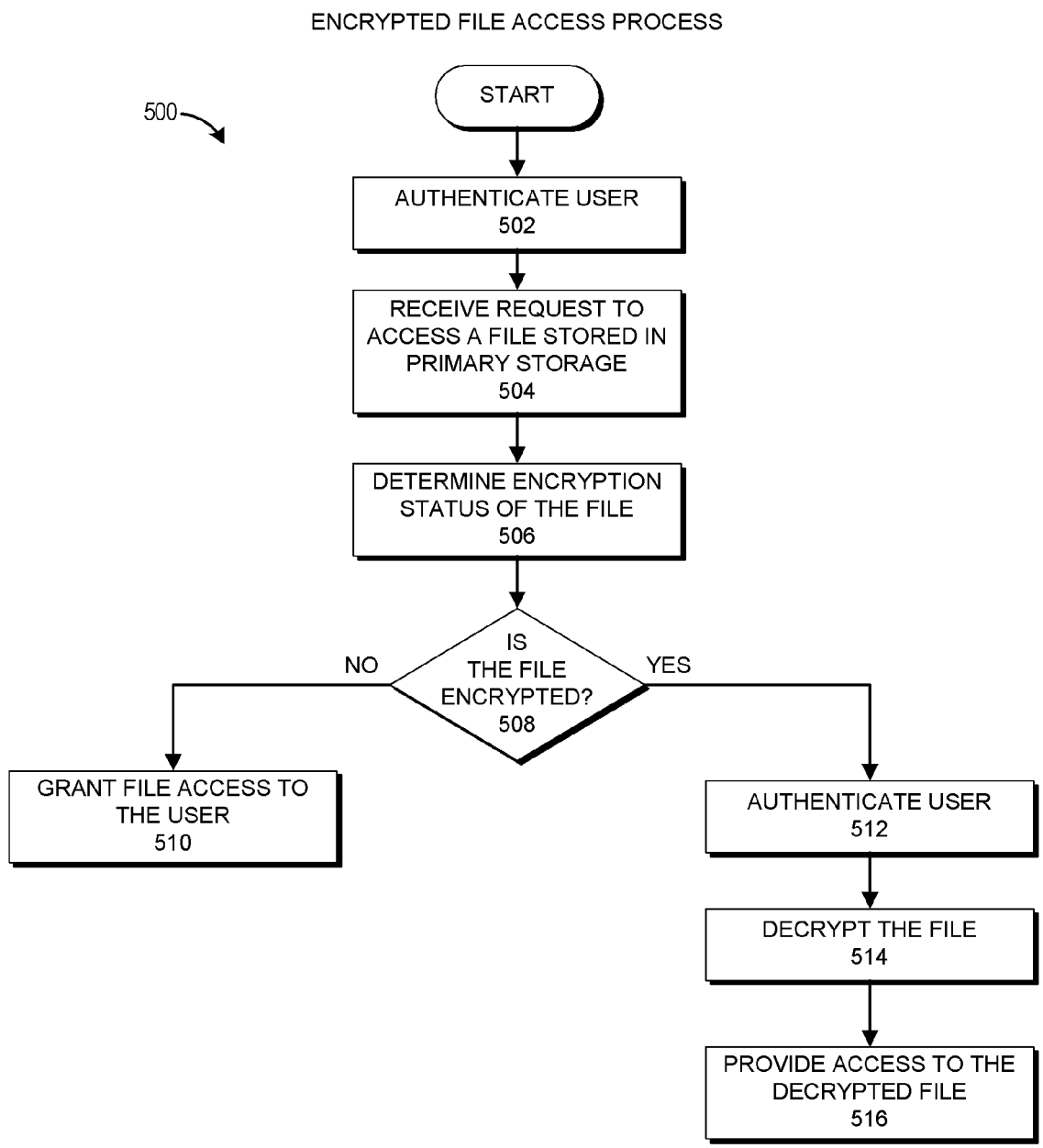
FIG. 5 illustrates an example embodiment of an encrypted file access process.

FIG. 5 illustrates an example embodiment of an encrypted file access process 500. The process 500 can be implemented, at least in part, by any system that can provide a user and/or application with access to a file that has been encrypted using an encryption process, such as the process 300. For example, the process 500, in whole or in part, can be implemented by the filter driver 204, the interface agent 220, the secure file access module 224, the decryption module 228, and the authentication system 206, to name a few. Although any number of systems, in whole or in part, can implement the process 500, to simplify discussion, portions of the process 500 will be described with reference to particular systems.

The process 500 begins at block 502 where, for example, the authentication system 206 authenticates a user. The block 502 may be performed in response to the user attempting to access the client computing device 102 (e.g., at login), access an encrypted file, or in some cases, in response to both an attempt to access the client computing device 102 and an attempt to access an encrypted file. In certain embodiments, the block 502 is optional.

At block 504, the secure file access module 224 receives a request to access a file stored in the primary storage device 104. Generally, the request is sent by a user of the client computing device 102 or an application 110 to the file system 202 and is intercepted by the filter driver 204, which provides the request to the secure access module 224. However, in some cases, the request to access the file may be addressed to the filter driver 204. In some embodiments, the request to access the file may be received from a remote system. For example, the request to access the file may be received from another client computing device, from a mobile device, from a server, or from any other computing device that can request file access on behalf of a user or application.

The secure file access module 224 determines the encryption status of the file at block 506. Determining the encryption status of the file can include examining the file extension of the file, the icon associated with the file, metadata associated with the file, the storage location of the file, a table that identifies encrypted files and/or the encryption status of files, and any other data or source that can be used to determine the encryption status of the file. At decision block 508, the secure file access module 224 determines whether the encryption status of the file indicates that the file is encrypted. If not, the secure file access module 224 at block 510 grants file access to the user, or application 110, that provided the request to access the file at the block 504. In some cases, granting access to the file involves the secure file access module 224 allowing the file access request to proceed. In other words, the file access request of the block 504 may be performed as if the filter driver 204 were not present.

In some embodiments, the block 510 may include additional operations. For example, the block 510 may include logging access to the file or notifying a user (e.g., an administrator) that the file was accessed.

If the secure file access module 224 determines that the file is encrypted at decision block 508, the authentication system 206 authenticates the user at block 512. Authenticating the user can include determining whether the user is authorized to access the encrypted file. In some embodiments, the secure file access module uses authentication information obtained at the block 502 to identify the user. The authentication information can then be used to determine whether the user is authorized to access the file without obtaining additional information from the user. Advantageously, in some cases, by using information obtained at the block 502 in place of requesting authentication information at the block 512, a user can access a file without being aware of whether the file is encrypted.

In some cases, the secure file access module 224 can determine the files the user is authorized to access, encrypted or not, when the user is authenticated at the block 502. In such cases, the block 512 is unnecessary. Thus, in some embodiments, the block 512 is optional. In other embodiments, the block 502 may be optional, and the secure file access module may determine whether the user is authorized to access a file by, in part, using the authentication system 206 to authenticate the user at the block 512.

In certain embodiments, the secure file access module 224 may access metadata and/or access control information associated with a user to determine whether the user is authorized to access the encrypted file. This metadata and/or access control information may be stored at the primary storage device 104, on a device on the network, in a secure storage location associated with the client computing device 102, on a smartcard or other personal security device associated with the user, or at any other location that can be used to store authorization information associated with a user.

At block 514, assuming that it is determined that the user is authorized to access the encrypted file, the decryption module 228 decrypts the encrypted file. Decrypting the file can include identifying the type of encryption used to encrypt the file and determining a corresponding decryption algorithm. The decryption module 228 can determine the type of encryption used based on a variety of factors including, for example, metadata associated with the file, metadata associated with the user, a source of the file, a type of the file, a header associated with the file, a storage location of the file, etc. In some cases, decrypting the file may include identifying a public key to decrypt the file when the file was encrypted with a corresponding private key.

If the user was not successfully authenticated, or was not authorized to access the file, the request to access the file is rejected. Rejecting access to the file can include logging the attempted file access and/or alerting another user (e.g., an administrator) regarding the attempted file access.

At block 516, the secure file access module 224 provides the user and/or application 110 with access to the decrypted file. In some cases, providing access to the decrypted file can include sending the decrypted file over a network to a remote device. Assuming the file was not modified, the filter driver may delete the decrypted file upon detecting the user and/or application 110 has finished accessing the file (e.g., upon detection of a "file close" command). If the file is modified, the process 300 may in some cases be initiated.

Example of a File Backup Process

Figure 6:
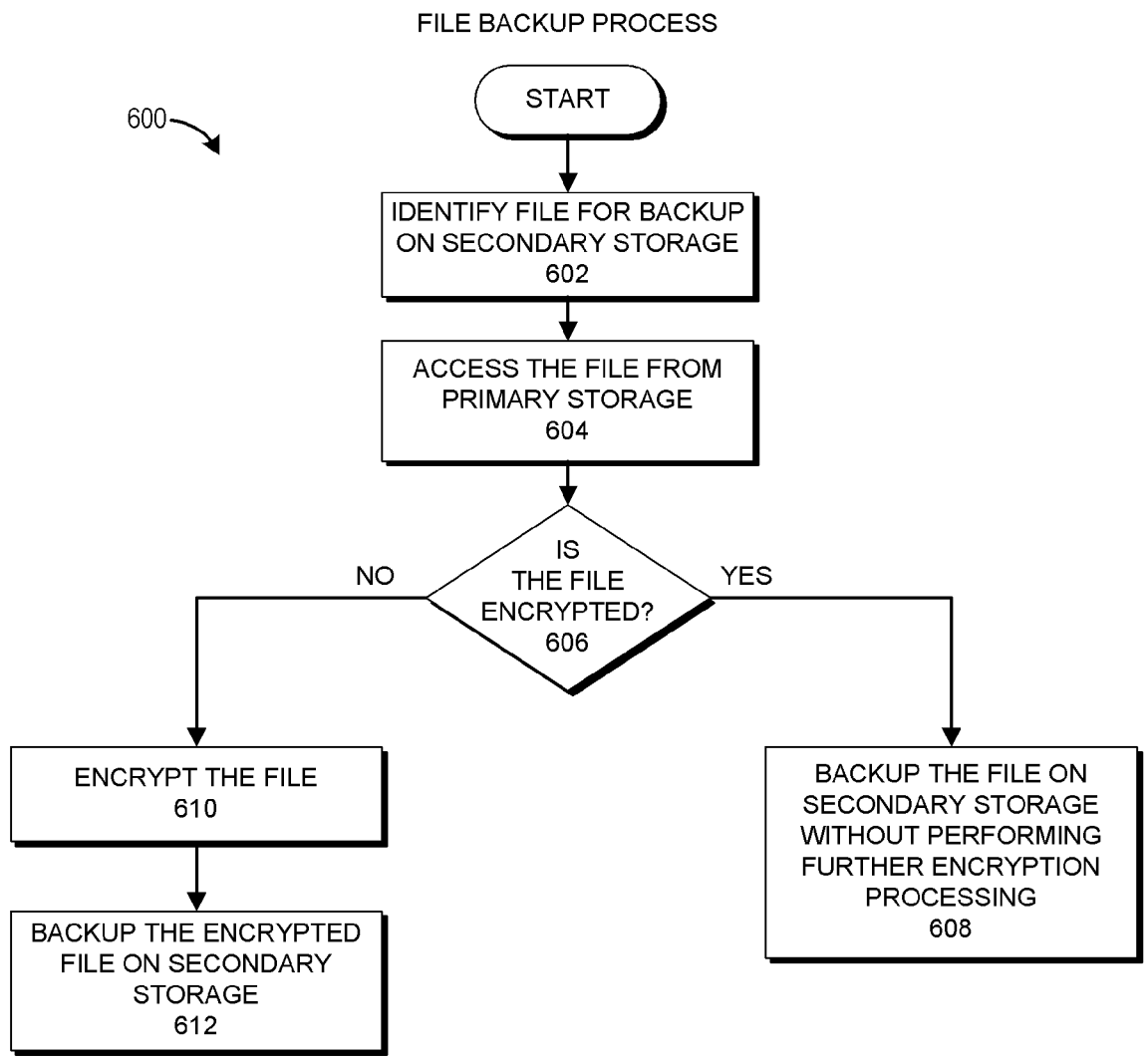
FIG. 6 illustrates an example embodiment of a file backup process.

FIG. 6 illustrates an example embodiment of a file backup process 600. The process 600 can be implemented, at least in part, by any system that can backup a file to a secondary storage device 108. For example, the process 600, in whole or in part, can be implemented by the storage manager 140, a data agent 142, a secondary storage computing device 106, and a media agent 144, to name a few. Although any number of systems, in whole or in part, can implement the process 600, to simplify discussion, portions of the process 600 will be described with reference to particular systems.

The process 600 begins at block 602 where, for example, a data agent 142 associated with an application 110 identifies a file accessible by the application 110 for backup on a secondary storage device 108. In some cases, the data agent 142 performs the block 602 in accordance with a backup policy provided or established by the storage manager 140. Alternatively, the storage manager 140 may perform the block 602. In another alternative, the storage manager 140 may initiate the process 600 by providing a backup command to the data agent 142, which may or may not identify the file for backup. In other cases, a user may identify the file for backup on the secondary storage device 108. The process 600 may be initiated as part of a scheduled or automatic backup process, or may be initiated manually (e.g., in response to a user command).

At block 604, the data agent 142 accesses the file identified at the block 602 from the primary storage 104. The data agent 142 can provide the file to a secondary storage computing device 106 associated with a media agent 144. Alternatively, the data agent 142 may provide the file to the storage manager 140, which can then provide the file to the secondary storage computing device 106. In some embodiments, the data agent 142 makes the file available to the secondary storage computing device 106. The media agent 144 of the secondary storage computing device 106 can then access the client computing device 102 to obtain the file. Generally, regardless of how the file is provided, providing the file to the secondary storage computing device 106 involves providing a copy of the file to the secondary storage computing device 106. Thus, the copy of the file may remain on the primary storage device 104.

However, in some cases, providing the file to the secondary storage computing device 106 involves providing the file itself to the secondary storage computing device 106. Thus, in some cases, a copy of the file may no longer exist on the primary storage device 104 after the backup process is complete. For example, during an archiving process, the file or a copy of the file may be provided to the secondary storage computing device 106 and may be removed from the primary storage device 104. When the file is restored from secondary storage, the file may be decrypted and stored on the primary storage device 104 as described in more detail below. However, typically, at least a copy of the file will exist on both the primary storage device 104 and a secondary storage device 108 during performance of and/or subsequent to completion of the process 600. In some cases, an archived copy of the file may remain on the primary storage device 104.

The media agent 144 determines at decision block 606 whether the file is encrypted. This determination may be based on one or more factors including the file itself and/or metadata associated with the file. For example, the media agent 144 may examine the file name, the data stored in the file, a tag associated with the file, or any other information that can be used to determine the encryption status of a file. In some cases, the encryption status of the file is provided to the media agent 144 by another system (e.g., the data agent 142 or the storage manager 140).

In addition to determining whether the file is encrypted, the media agent 144, at decision block 606, may in some cases identify the system that encrypted the file. For example, the media agent 144 may determine whether the file was encrypted by the client computing device 102 (e.g., by the encryption module 222), by another computing device included within the information management system 100, or by a computing system that is external to the information management system 100. In some embodiments, the media agent 144 may treat files that were encrypted by particular computing systems, or files that were not encrypted by particular computer systems as unencrypted files with respect to the process 600. In other words, in some cases, the media agent 144 may re-encrypt, or encrypt a second time, or cause files to be re-encrypted that are already encrypted based on the computing system that initially encrypted the file.

If the media agent 144 determines at the decision block 606 that the file is encrypted, the media agent 144 stores the file on a secondary storage device 108 without performing an encryption process at block 608. If multiple secondary storage devices 108 exist, the media agent 144 may store the file on the secondary storage device 108 specified by the storage manager 140. Alternatively, the media agent 144 selects the secondary storage device 108 to store the file based on one or more storage device selection rules. These rules may be based on the type of file, the source of the file, a user associated with the file, a data agent associated with the file, or any other information that can be used to determine the location or the device to backup a file.

After identifying the secondary storage device 108 to store the file, or secondary or backup copy of the file, the media agent 144 may identify the secondary storage device 108 to the storage manager 140. The storage manager 140 may associate the identity of the secondary storage device 108 along with the identity of the file in a repository (e.g., the management database 146). In addition, or alternatively, the media agent 144 may associate the identity of the secondary storage device 108 along with the identity of the file in a repository (e.g., the media agent database 152. Further, one or more of the storage manager 140 and the media agent 144 may store at the repository information relating to the encryption algorithm used to encrypt the file. For example, one or both systems may store the identity of the algorithm used to encrypt the file, the identity of an algorithm capable of decrypting the file, the identity of the system that encrypted the file, and the like.

If the media agent 144 determines at the decision block 606 that the file is not encrypted or, in some cases, should be encrypted a second time, the media agent 144 encrypts the file, or causes the file to be encrypted, at block 610. In some cases, the media agent 144 may use the same encryption algorithm regardless of the file to be encrypted. In other cases, the media agent 144 may select an encryption algorithm based on the file (e.g., the name of the file, the size of the file, the type of file, the owner of the file, etc.), the secondary storage device 108 where the file is to be stored, the client computing device 102 that provided the file, or any other factor that can be used to determine the encryption algorithm to use to encrypt the file. In yet other cases, the encryption algorithm may be selected by the storage manager 140.

At block 612, the media agent 144 stores the encrypted file on a secondary storage device 108. In some embodiments, the block 612 can include one or more of the embodiments described above with respect to the block 608. For example, in some cases, the media agent 144 may select the secondary storage device 108 based on one or more storage device selection rules. As a second example, the media agent 144 may store with the file the identity of the encryption algorithm used to encrypt the file. In addition, or alternatively, the media agent 144 may store the identity of the encryption algorithm used to encrypt the file along with the storage location of the file in a table at the media agent database 152 and/or at the storage manager 140. In some cases, the storage location of the file may be stored at the client computing device 102.

In some embodiments, a copy of the file may be stored at the secondary storage computing device 106 (e.g., as part of a cache) as part of the block 608 and/or the block 612. The copy of the file may be stored for a specific period of time or until evicted, which, for example, may occur as part of a cache maintenance process or to make room in the cache for additional files.

Advantageously, in certain embodiments, the process 600 may be used to perform a selective encryption backup process. In some cases, encrypting only unencrypted files during a backup process, time and computing resources can be saved during the backup process. Alternatively, in some cases, the process 600 can be used to encrypt all files regardless of encryption status. By encrypting all files regardless of encryption status during a backup process, the process 600 can be used to ensure consistent encryption across files of a backup.

Example of a File Restoration Process

Figure 7:
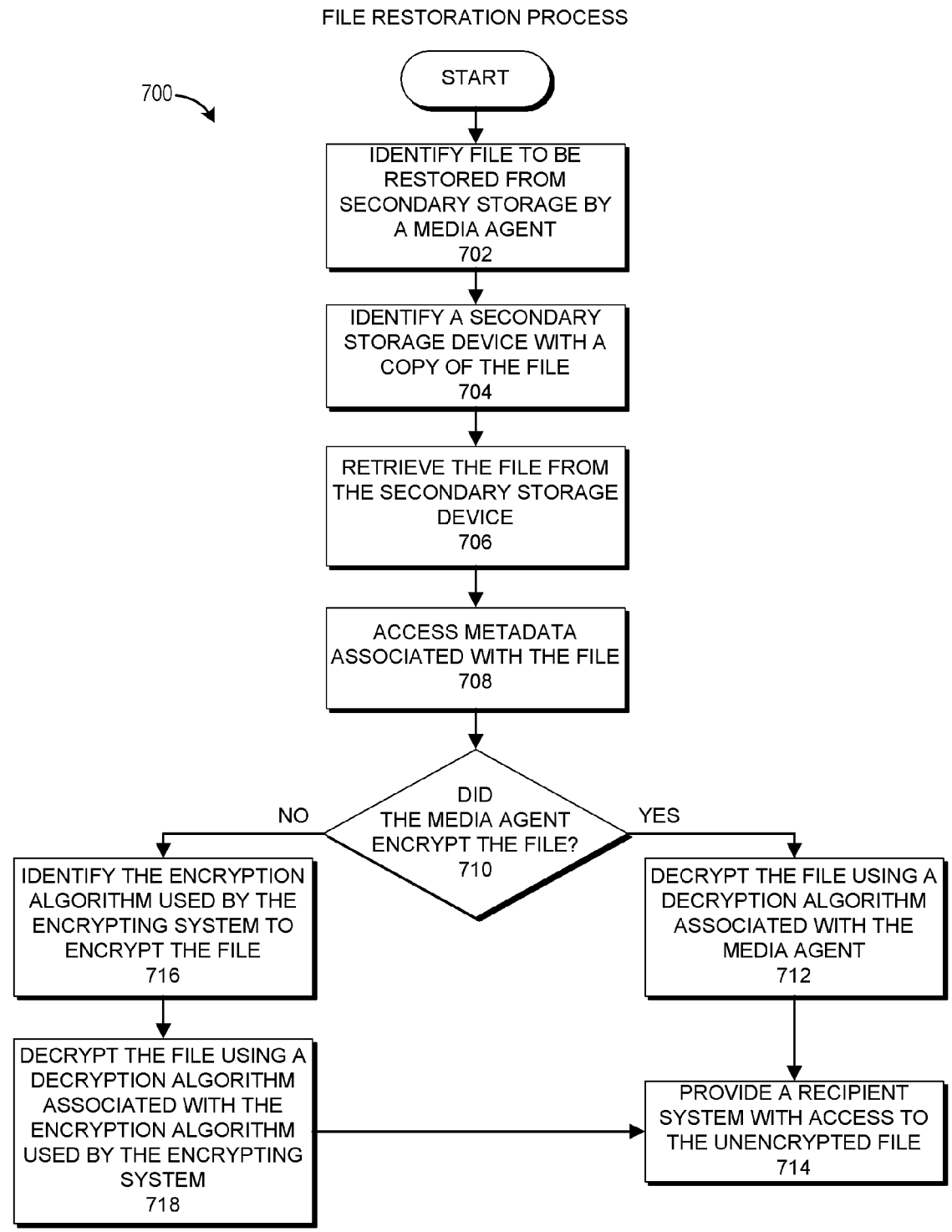
FIG. 7 illustrates an example embodiment of a file restoration process.

FIG. 7 illustrates an example embodiment of a file restoration process 700. The process 700 can be implemented, at least in part, by any system that can restore a file from a secondary storage device 108 to a recipient system (e.g., the client computing device 102). For example, the process 700, in whole or in part, can be implemented by the storage manager 140, a secondary storage computing device 106, and a media agent 144, to name a few. Although any number of systems, in whole or in part, can implement the process 700, to simplify discussion, portions of the process 700 will be described with reference to particular systems.

The process 700 begins at block 702 where, for example, a storage manager 140 identifies a file to be restored from a secondary storage device 108 by a media agent 144. The file may be identified as part of a restore command received from the storage manager 140 at a secondary storage computing device 106. In some cases, the restore command is sent to a particular secondary storage computing device 106 based on the file to be restored. The storage manager 140 can determine which secondary storage computing device 106 to send the restore command based on information stored at the storage manager 140, such as a table of file locations. In some cases, the process 700 may be performed as part of a system or storage device restore process. In other cases, the process 700 may be initiated by a client computing device 102. For example, the client computing device 102 may identify the file to be restored at the block 702 or may send the restore command to the secondary storage computing device 106 and/or media agent 144.

At block 704, the media agent 144 identifies a secondary storage device 108 that includes a copy of the file identified at the block 702. The secondary storage device 108 may be identified based on the restore command that may be received as part of the block 702. Alternatively, the secondary storage device 108 may be identified based on the file to be restored and/or based on a storage location table included as part of the media agent database 152 that identifies the location of stored files. The identified storage location may include the secondary storage device 108 from a set of secondary storage devices and, in some cases, may include the location within the identified secondary storage device 108 that has the copy of file. In some embodiments, the block 704 is optional. For example, in some cases, the media agent 144 has access to a single secondary storage device 108.

At block 706, the media agent 144 retrieves the file from the secondary storage device 108. Further, the media agent 144 accesses metadata associated with the file at block 708. The metadata may include the file name, the file extension, or additional information stored with the file or at a table with an entry for the file, such as a table at the media agent database 152.

Based, at least in part, on the metadata accessed at the block 708, the media agent 144 determines at decision block 710 whether the media agent 144 encrypted the file. In some embodiments, the media agent 144 determines whether any media agent included in a secondary storage device encrypted the file. Further, in some cases the decision block 710 can include determining whether any media agent associated with an information management system 100 of an organization encrypted the file. In other words, in some cases, the decision block 710 can include determining whether the file was encrypted as part of a storage operation associated with secondary storage or with primary storage, or whether the encryption occurred at a system external to the information management system 100 as may occur when a user or application receives an encrypted file from a third-party user or system.

If the media agent 144 determines that it encrypted the file at the decision block 710, the media agent 144 at block 712 decrypts the file retrieved at the block 706 using a decryption algorithm associated with the media agent 144. In cases where the media agent 144 may have used one of several encryption algorithms to encrypt the file, the media agent 144 may identify the decryption algorithm based on the metadata accessed at the block 708. Alternatively, the decryption algorithm may be identified as part of the restore command or included with the identification of the file to restore at the block 702.

As previously described, in some cases the file may have been encrypted by other systems within the secondary storage subsystem 118, such as by other media agents 144 or secondary storage computing devices 106. In such cases, the media agent 144 may determine the decryption algorithm based on the device that encrypted the file or by communicating with the device that encrypted the file, such as by accessing metadata stored at the device that encrypted the file.

Once the media agent 144 has decrypted the file, the secondary storage computing device 106 provides a recipient system with access to the unencrypted file at block 714. The recipient system may be the system that requested the file (e.g., the client computing device 102), a mobile device in communication with a computing system in the primary storage subsystem 117 of the information management system 100 (e.g., a client computing device 102 or a server (not shown)), the storage manager 140, a system identified by the storage manager 140, or any other system that may be authorized to access the decrypted file. Further, providing access to the decrypted file can include sending the decrypted file to the recipient system, sending the file to another system (e.g., the storage manager 140) to provide to the recipient system, or enabling the recipient system to access the secondary storage computing device 106 to obtain the decrypted file. Moreover, in some cases, providing access to the decrypted file can include providing one or more data agents 142 at the recipient system with access to the decrypted file.

If the media agent 144 determines that it did not encrypt the file at the decision block 710, the media agent 144 at block 716 identifies the encryption algorithm used by the encrypting system to encrypt the file. The media agent 144 may identify the encryption algorithm based on the file, metadata associated with the file, information provided by the storage manager 140, information provided by the recipient system, information included in the restore command, or any other data that can be used to identify the encryption algorithm. In some cases, the encryption information may include a key, such as a public key, for decrypting the file.

At block 718, the media agent 144 decrypts the file using a decryption algorithm associated with the encryption algorithm identified at the block 716. In some cases, the media agent 144 may use a key provided and/or identified at the block 716 to decrypt the file. After the file is decrypted, the secondary storage computing device 106 provides a recipient system with access to the unencrypted file at block 714 as previously described.

In some embodiments, the blocks 716, 718, and 714 may be optional. For example, if the media agent 144 determines that it did not encrypt the file at the decision block 710, it may send the encrypted file to the recipient system without decrypting the file. In such cases, the recipient system (e.g., client computing device 102) may decrypt the file or provide the file to another system for decryption.

Second Example of a File Restoration Process

Figure 8:
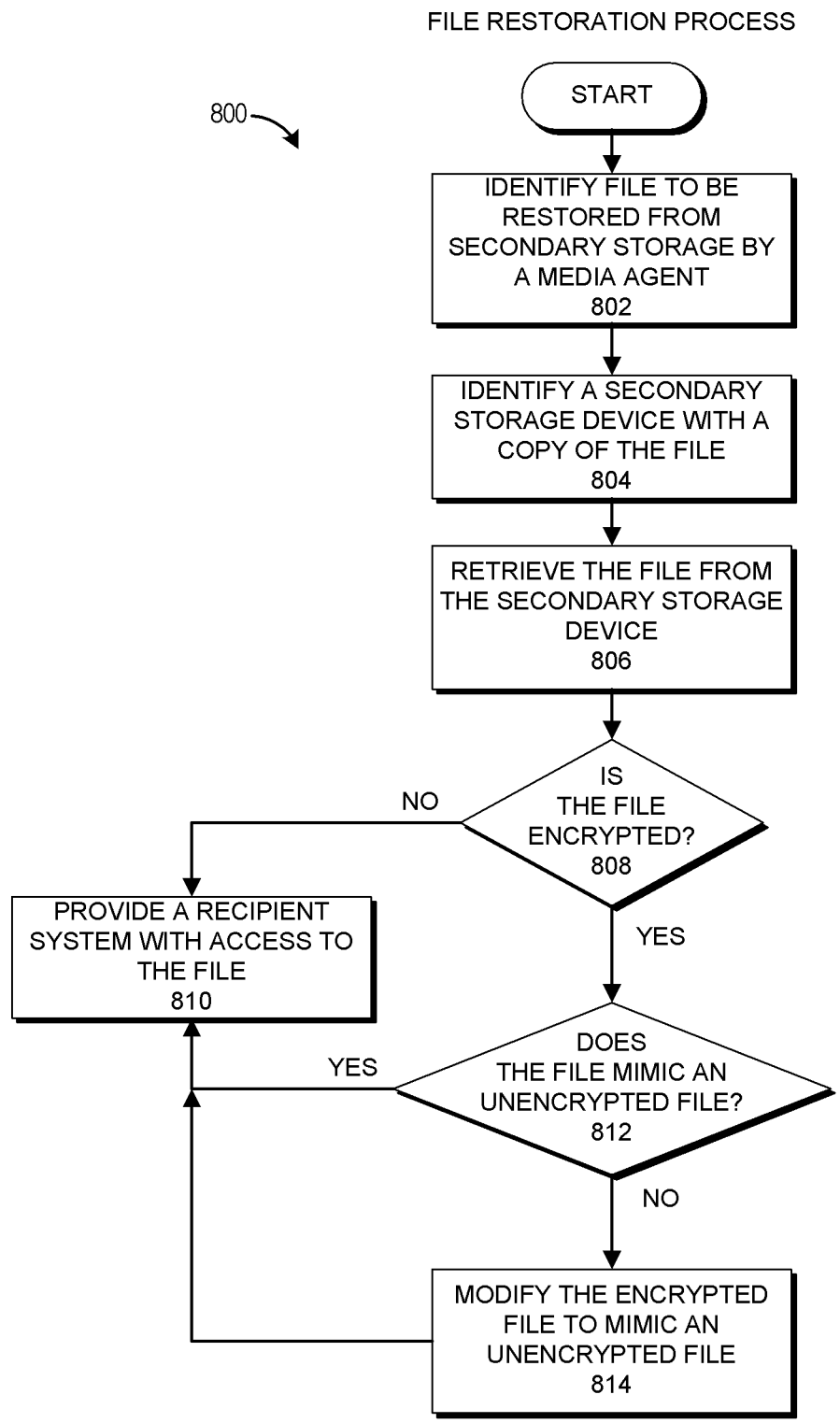
FIG. 8 illustrates a second example embodiment of a file restoration process.

FIG. 8 illustrates a second example embodiment of a file restoration process 800. The process 800 can be implemented, at least in part, by any system that can restore a file from a secondary storage device 108 to a recipient system (e.g., the client computing device 102). For example, the process 800, in whole or in part, can be implemented by the storage manager 140, a secondary storage computing device 106, and a media agent 144, to name a few. Although any number of systems, in whole or in part, can implement the process 800, to simplify discussion, portions of the process 800 will be described with reference to particular systems.

The process 800 begins at block 802 where, for example, a storage manager 140 identifies a file to be restored from a secondary storage device 108 by a media agent 144. The media agent 144 identifies at block 804 a secondary storage device 108 that includes a copy of the file to be restored. In some embodiments, the blocks 802 and 804 can include one or more of the embodiments described above with respect to the blocks 702 and 704 respectively.

At block 806, the media agent 144 retrieves the file from the secondary storage device 108 identified at the block 804. In some embodiments, the block 806 can include one or more of the embodiments described above with respect to the block 706. Further, in some cases, the block 806 can include accessing metadata associated with the file. In such cases, the block 806 can include one or more of the embodiments described above with respect to the block 708.

At decision block 808, the media agent 144 determines whether the file is encrypted. The media agent 144 may make this determination based, at least in part, on metadata associated with the file. Alternatively, or in addition, the media agent 144 may determine whether the file is encrypted by analyzing the file itself. In some embodiments, the decision block 808 may be optional. For example, if every system capable of storing a file at a secondary storage device 108 is configured to encrypt each file before storing the file, then the decision block 808 may be optional. In some embodiments, the decision block 808 can include one or more of the embodiments described above with respect to the decision block 710.

If the media agent 144 determines at the decision block 808 that the file is not encrypted, the secondary storage computing device 106 provides a recipient system with access to the file at block 810. Once the recipient system has received the file, the recipient system can present it to a user or provide an application with access to the file via, for example, the interface agent 220, the secure file access module 224, or a data agent 142. In some embodiments, the block 810 can include one or more of the embodiments described above with respect to the block 714.

If the media agent 144 determines at the decision block 808 that the file is encrypted, the media agent 144 determines whether the file mimics an unencrypted file at decision block 812. The determination of the decision block 812 is based on an unencrypted file of the same type as the decrypted version of the file retrieved at the block 806. The media agent 144 may make the determination at the decision block 812 based, at least in part, on metadata associated with the file and/or the file itself. In some embodiments, the decision block 812 may be optional. For example, if every system capable of storing a file at a secondary storage device 108 is configured to configure each encrypted file to mimic an unencrypted file before storing the file, then the decision block 812 may be optional.

As previously described with respect to the block 408, an encrypted file that mimics an unencrypted file can include a reference to the encrypted file that shares some or all of the display characteristics of a reference to an unencrypted file. For example, the reference to the encrypted file may include the same extension and/or the same icon as a reference to the unencrypted file. In some cases, at least some of the metadata associated with the encrypted file may be the same as the metadata associated with an unencrypted copy of the file. For example, the metadata associated with the encrypted file may identify one or more applications that can access the file as if it were unencrypted regardless of whether the one or more applications can access the file in its encrypted form. Thus, in some cases, a user accessing the metadata for the encrypted file may, in some cases, not be able to identify the file as an encrypted file. Further, in some instances, at least some applications may not be able to identify whether the file is encrypted based on the metadata associated with the file.

If at the decision block 812 the media agent 144 determines that the file does not mimic an unencrypted file, the media agent 144 modifies the encrypted file to mimic an unencrypted file at the block 814. Generally, the modification of the block 814 does not include decrypting the file. Thus, the modified file remains an encrypted file. Modifying the encrypted file may include modifying one or more of the factors described above with respect to the decision block 812 in determining whether the file mimics an unencrypted file. For example, modifying the encrypted file can include changing the icon used to display a reference to the encrypted file to the user to match the icon used to display a reference to the unencrypted file to the user. As previously described, in some cases, the icon may be annotated. Further, as a second example, modifying the encrypted file can include changing a the file name and/or file extension of the encrypted file to match the file name and/or file extension of an unencrypted version of the file. In other cases, changing the file name may include hiding a portion of the file name and/or file extension so that it is not displayed to a user.

Once the encrypted file, or a reference to the encrypted file, has been modified at the block 814, or if at the decision block 812 the media agent 144 determines that the file mimics an unencrypted file, the secondary storage computing device 106 provides a recipient system with access to the file at block 810 as previously described. The recipient system (e.g., the client computing device 102) using, for example, the decryption module 228 can decrypt the file for presentation to a user or for provisioning to an application. In some cases, the decryption of the file may occur upon the recipient system obtaining access to the file. In other cases, the decryption of the file may occur at a later time. In either case, the file may be stored at the primary storage device 104 upon the recipient system receiving access to the file.

In some cases, as has been described, the process 800 is a multi-tier file restoration process. In such cases, a first portion of the restoration process is performed by one or more systems within the secondary storage subsystem 118 of the information management system 100 and a second portion of the file restoration process being performed by one or more systems within the primary storage subsystem 117 of the information management system 100.

Further, in some embodiments, the recipient system may use the process 500 to provide a user and/or application with access to the file. As previously described, in some embodiments, the media agent 144 may decrypt the file at the block 814 and can provide the recipient system with access to the decrypted file.

Second Example Client Computing Environment

Figure 9:
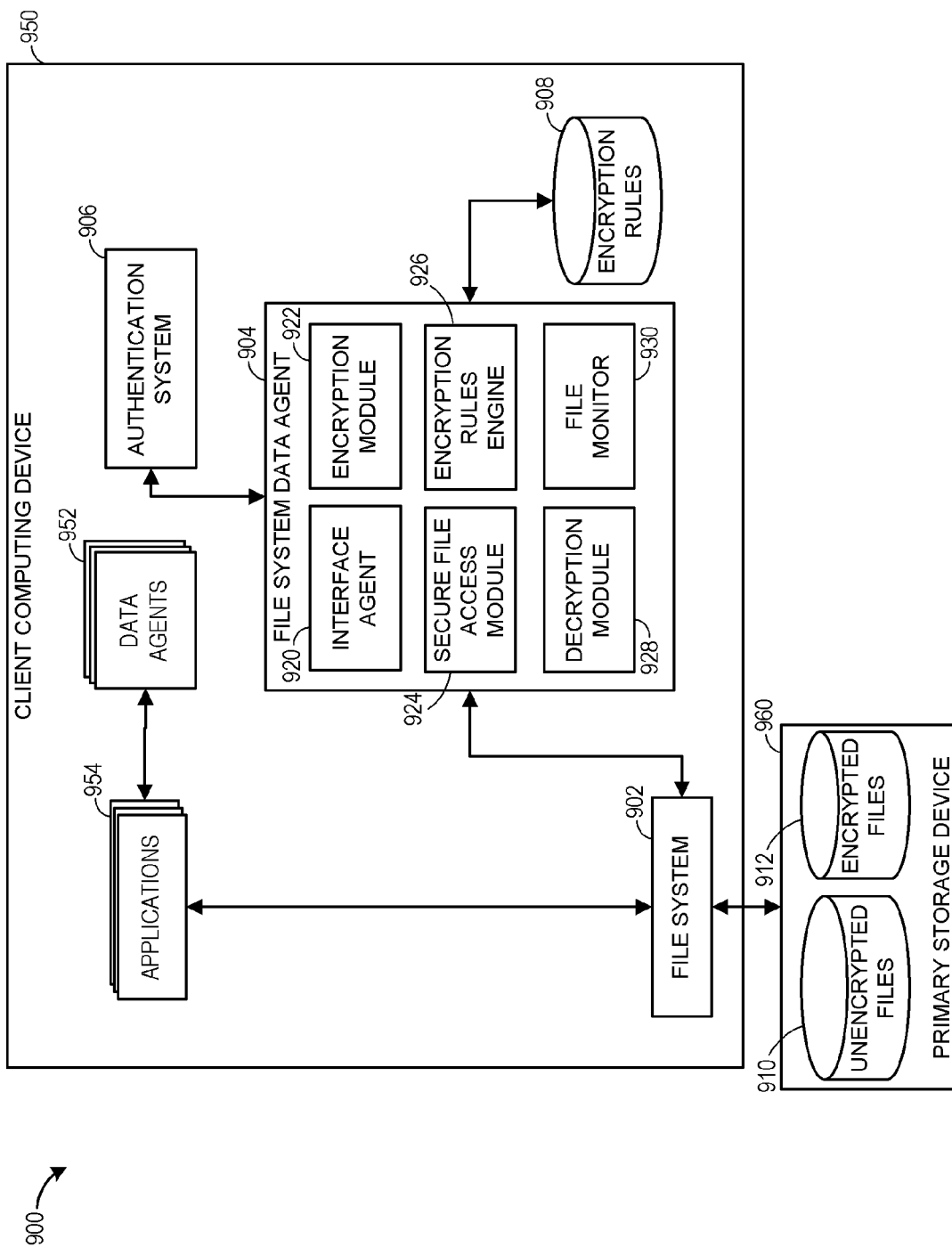
FIG. 9 is a block diagram illustrating a second example of a client computing environment including a client computing device and a primary storage device.

FIG. 9 is a block diagram illustrating a second example of a client computing environment 900 including a client computing device 950 and a primary storage device 960. The client computing device 950 and the primary storage device 960 can be included as part of the information management system 100 previously described above with respect to FIGS. 1A-1E. Further, the client computing device 950 and the primary storage device may be included in the primary storage subsystem 117. Moreover, in certain embodiments, the client computing device 950 can include one or more of the embodiments described with respect to the client computing device 102. Likewise, the primary storage device 960 can include one or more of the embodiments described with respect to the primary storage device 104.

The client computing device 950 may include a number of systems and subsystems and be capable of executing a number of different types of software. For instance, the client computing device 950 may include one or more applications 954, a file system 902, one or more data agents 952, an authentication system 906, and an encryption rules repository 908. Further, at least one of the data agents 952 may be a file system data agent 904. Although a single file system 902 and a single file system data agent 904 are illustrated in FIG. 9, in some embodiments, the client computing device 950 may include multiple file systems and/or multiple file system data agents. The file system 902 can include any type of file system. For example, the file system 902 may include a Microsoft Windows based file system or a Linux based file system. Furthermore, in some embodiments, the file system 902 may include one or more of the embodiments previously described with respect to the file system 202.

The applications 954 can include any type of application. Further, the applications 954 can include one or more embodiments previously described with respect to the applications 110. Some or all of the applications may be associated with one or more data agents 952. As previously described, a data agent may assist with the performance of information management operations based on the type of data that is being accessed and/or protected, at a client-specific and/or application-specific level. Further, at least some of the data agents 952 may include one or more of the embodiments previously described with respect to the data agents 142.

As with the client computing device 102, the client computing device 950 may include an authentication system 906. The authentication system 906 may include any system configured to authenticate a user attempting to use the client computing device 950 and/or attempting to access files stored on the primary storage device 960, or store elsewhere. Further, the authentication system 906 may include one or more of the embodiments previously described with respect to the authentication system 206.

The file system data agent 904 can include a data agent that facilitates the file system 902 managing data processed or organized by the file system 902. For example, as previously described, the file system data agent may be involved in handling data files and/or system files, and may facilitate backing up the file system 902 of the client computing device 950. Backing up the file system 902 may include backing up files stored at the primary storage device 960. In certain embodiments, the file system data agent 904 can perform one or more processes associated with the filter driver 204. Thus, in some embodiments, the file system data agent 904 and/or its subsystems can include one or more of the embodiments described with respect to the filter driver 204 and/or it subsystems.

The primary storage device 960 can include any storage device for storing primary data. For example, the primary storage device 960 may be a hard drive, a solid state drive, memory, flash, etc. Although illustrated as a separate system, the primary storage device 960 may be included as part of the client computing device 950. Further, the primary storage device 960 may include one or more of the embodiments described with respect to the primary storage device 104. As previously described with respect to FIG. 2, the primary storage device may include a number of repositories to facilitate storing and/or organizing data stored by the primary storage device. For instance, the primary storage device 960 may include a repository 910 for storing unencrypted files and a repository 912 for storing encrypted files. In some embodiments, the primary storage device 960 may be organized into a lesser number or a greater number of repositories and/or partitions.

Each data agent may include a number of systems or subsystems that facilitate the data agent processing data for a corresponding application or system. For instance, the file system data agent 904 may include an interface agent 920, an encryption module 922, a secure file access module 924, an encryption rules engine 926, a decryption module 928, and a file monitor 930. In some embodiments, the file system data agent 904 may include fewer or additional subsystems. For instance, the encryption module 922 and the decryption module 928 may be part of a single subsystem. As a second example, the secure file access module 924 may be optional because, for example, a separate system may handle secure file access.

The interface agent 920 may be configured to control how files, or references to files (e.g., file names, file icons, etc.), are displayed to a user. Controlling how files are displayed can include controlling whether a file reference to an encrypted files is displayed as a file reference to an unencrypted file or as an annotated version of a reference to an unencrypted file. For instance, a file icon for an encrypted file may be the same as for an unencrypted file. Alternatively, the file icon may include an asterisk to indicate that it represents an encrypted file. In some embodiments, the interface agent 920 can include one or more of the embodiments described with respect to the interface agent 220.

In some cases, the file system data agent 904 may use an encryption rules engine 926, which can access encryption rules from the encryption rules repository 908, to determine whether a file is to be encrypted. If the encryption rules engine 926 determines that a file should be encrypted, the encryption module 922 can perform encryption of the file and, in some cases, of the encryption key used to encrypt the file. The encryption module 922 can include any encryption engine that can encrypt a file using one or more encryption algorithms. Further, the encryption module 922 can be used to encrypt encryption keys. In some embodiments, the encryption rules engine 926 can include one or more of the embodiments described with respect to the encryption rules engine 226. Similarly, in some cases, the encryption module 922 can include one or more of the embodiments previously described with respect to the encryption module 222.

To decrypt files, the file system data agent 904 can use the decryption module 928, which can include any decryption engine that can decrypt a file using one or more decryption algorithms. Further, the decryption module 928 can be used to decrypt encrypted keys. In some cases, the decryption module 928 can include one or more of the embodiments previously described with respect to the decryption module 228.

The secure file access module 924 can determine the encryption status of a file and can manage the decryption and presentation of encrypted files to users who are authorized to access the file. Further, the secure file access module 924 can manage access by applications and/or computing systems attempting to access the file. In some embodiments, the file access module 924 can include one or more of the embodiments previously described with respect to the secure file access module 224.

In some embodiments, the decision of whether to encrypt a file at the primary storage device may be based on whether the file has been modified. Further, the decision of whether to decrypt a file may be based on whether a file has been selected for backup to a secondary storage device 106, or whether a user or application desires to access the file. The file monitor 930 can include any system that can monitor activity with respect to the file to facilitate determining whether the file needs encrypting or decrypting. This determination may be made based, at least in part, on rules stored at the encryption rules repository 908 and/or commands received from a user, application, and/or storage manager 140. In some embodiments, the file monitor 930 can include one or more of the embodiments described with respect to the file monitor 230.

Example User Key Encryption Process

Figure 10A:
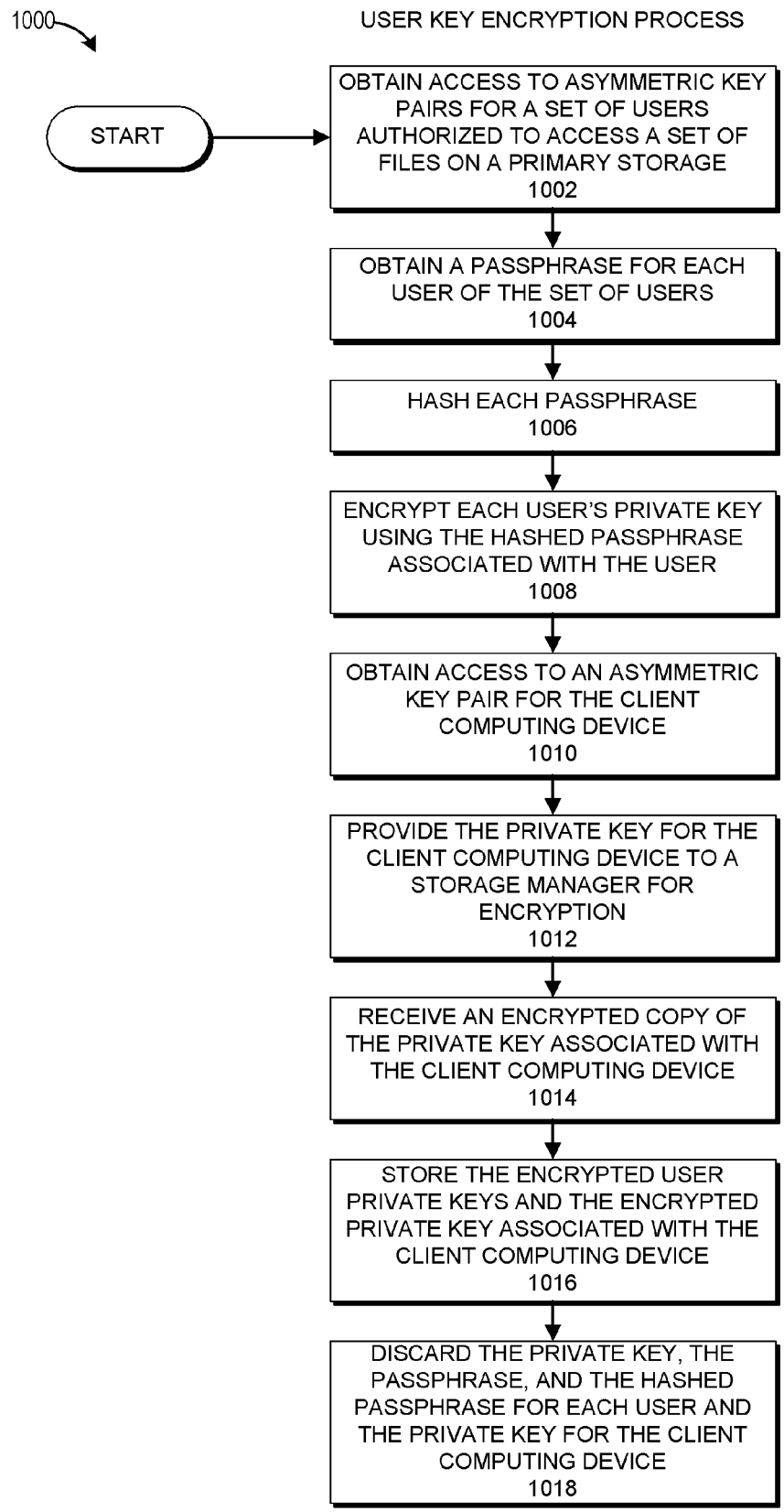
FIG. 10A illustrates an example embodiment of a user key encryption process.

FIG. 10A illustrates an example embodiment of a user key encryption process 1000. The process 1000 can be implemented, at least in part, by any system that can encrypt a private key from an asymmetric key pair (e.g., a private/public key pair). For example, the process 1000, in whole or in part, can be implemented by the filter driver 204, the file system data agent 904, the authentication system 906, the encryption rules engine 926, and the encryption module 922, to name a few. Although any number of systems, in whole or in part, can implement the process 1000, to simplify discussion, portions of the process 1000 will be described with reference to particular systems.

In some embodiments, the process 1000 may be combined and/or integrated with a process for encrypting a file for storage on a primary storage device, such as the process 1050, which is described below with respect to FIG. 10B. In some cases, the process 1000 may be performed at a time period that is earlier than a time period during which the process 1050 may be performed. In other cases, the process 1000 and the process 1050 may be performed together as part of a single process. In some cases, the process 1000 may be performed multiple times for a user. For example, a user or system may have different asymmetric key pairs for use with different sets of files.

Further, in some cases, the process 1050 may be performed a number of times as a file is encrypted and decrypted over the lifetime of the file, while the process 1000 may be performed once or some number of times fewer than the process 1050. For instance, the process 1000 may be used to obtain an encrypted copy of a user private key. Once the encrypted user private key is obtained, it may be unnecessary to perform the process 1000 again for that user. However, the process 1050 may be performed multiple times as a file may be encrypted and decrypted a number of times.

The process 1000 begins at block 1002 where, for example, the encryption module 922 obtains access to an asymmetric key pair for each user who is authorized to access a set of files at, or stored on, a primary storage 960. The set of files may include any number of files including a single file. Determining the users who are authorized to access the set of files may be based on metadata associated with the files and/or the user. Alternatively, or in addition, determining the users who are authorized to access the set of files may be based on identifying the users who are authorized to access the client computing device 950 or who have an account with the client computing device 950. Thus, in some cases, the block 1002 may identify users who are authorized to access the client computing device 950 and/or the primary storage 960 instead of the users who are authorized to access the set of files.

In some cases, only a single user may be authorized to access the set of files (e.g., the file author or owner for each of the files, or for a directory including the files). In other cases, a number of users may be authorized to access the set of files. The asymmetric key pair for each user may include a public key and a private key and may be generated based on any type of asymmetric key algorithm. For example, the asymmetric key pair may be generated using RSA.

The asymmetric key pairs may be obtained by accessing a key repository and/or by accessing the encryption rules repository 908. Alternatively, the asymmetric key pairs may be obtained from the storage manager 140. As yet another alternative, the asymmetric key pairs may be generated by the encryption module 922. An asymmetric key pair may be associated with a user regardless of the computing device or primary storage that the user accesses. In other cases, the asymmetric key pair may be specific to a user and a computing device and/or primary storage accessed by the user.

At block 1004, the encryption module 922 obtains a passphrase for each of the users. The passphrase may be a password, such as the password used by the user to login or to access the client computing device 950, or a password used to access a network used to communicate with systems of the primary storage subsystem 117. In such cases, the passphrase may be obtained by the authentication system 906. Often, the passphrase is unique to the user. However, in some cases, the passphrase may not be unique. In some embodiments, the passphrase of a user may be combined with information unique to a user to ensure that the passphrase obtained at the block 1004 is unique. For instance, the passphrase may include a combination of a user's password and a randomly, or pseudo-randomly, generated number assigned to the user that is unique to the user.

At block 1006, the encryption module 922 hashes each passphrase. Hashing the passphrase may include performing a hashing algorithm multiple times (e.g., 512 times, a thousand times, a million times, etc.) with each subsequent performance of the hashing algorithm using the result of the prior performance of the hashing algorithm as the input to be hashed. In some cases, the hashing may be performed a threshold number of times. The threshold may be selected based on a security level of the set of files. Advantageously, in certain embodiments, by hashing the passphrase multiple times, the probability that a malicious user is able to determine the passphrase based on the hashed passphrase is reduced. The encryption module 922 may use any type of cryptographic hash function. For example, the hash function can be a SHA-512, MD6, or BLAKE-512 hash function. In some cases, the encryption module 922 may pad the passphrase with additional data to ensure the passphrase is of a particular length.

At block 1008, the encryption module 922 encrypts, for each user, one of the keys from the asymmetric key pair (e.g., the private key) associated with the user using the hashed passphrase obtained at the block 1006. In some embodiments, the blocks 1002-1008 are optional. For example, the data encryption key used to encrypt the file may be secured using only keys associated with the client computing device 950, as described with respect to the blocks 1010-1014.

At block 1010, the encryption module 922 obtains access to an asymmetric key pair for the client computing device 950. The asymmetric key pair may include a public key and a private key and, as with the asymmetric key pairs of the block 1002, may be generated based on any type of asymmetric key algorithm. For example, the asymmetric keys may be generated using an RSA algorithm. Further, as with the user asymmetric key pairs, the asymmetric key pair of the client computing device 950 may be obtained by accessing a key repository and/or by accessing the encryption rules repository 908. Alternatively, the asymmetric key pair may be obtained from the storage manager 140. Further, in some cases, the asymmetric key pair may be generated by the encryption module 922.

At block 1012, the file system data agent 904 provides one of the keys from the asymmetric key pair (e.g., the private key) associated with the client computing device 950 obtained at the block 1010 to the storage manager 140 for encryption. In some embodiments, the block 1012 can include providing an identity of the client computing system 950 to the storage manager 140.

Upon receiving the private key, the storage manager 140 can access a passphrase associated with the client computing device 950. In some cases, the passphrase may be hashed, for example, by the storage manager 140. Further, the passphrase and/or the hashed version of the passphrase may be used to encrypt a copy of the private key. Thus, in some cases, the storage manager 140 may perform similar operations on the private key, provided to the storage manager at block 1012, as described above with respect to the blocks 1006 and 1008.

In some cases, the passphrase may be accessed from a repository, which may be included with the storage manager 140 or may be separate, but accessible by the storage manager 140 over, for example, a network. Alternatively, or in addition, the storage manager 140 may generate the passphrase for the client computing device 950. Moreover, in some cases, the passphrase is generated and used by computing systems without a user accessing the passphrase. Thus, in such embodiments, the passphrase may be automatically generated without user action. In some cases, the passphrase may include symbols and/or data that may be unreadable by a user or not alphanumeric. Further, in certain embodiments, the storage manager 140 may identify the client computing device 950 as available or accessible as opposed to lost or stolen. In some cases, marking the client computing device 950 as available, or not lost, may include marking the passphrase for the client computing device 950 as live or in-use.

At block 1014, the file system data agent 904 receives an encrypted copy of the private key associated with the client computing device 950 from the storage manager 140. In some embodiments, the blocks 1010-1014 may be optional. For example, in some cases, users may be associated with asymmetric key pairs for encrypting files at the primary storage 960, but the client computing device 950 may, in some cases, not be associated with its own asymmetric key pair.

At block 1016, the file system data agent 904 stores the encrypted user private keys (obtained at the block 1008) and the encrypted private key associated with the client computing device 960 (obtained at the block 1014). In cases where the block 1008 or the block 1014 is optional, the block 1016 may store the encrypted user private keys or the encrypted private key for the client computing device 960 respectively. Storing the encrypted private keys may include storing the encrypted private keys in one or more of the primary storage 960, the file system data agent 904, a registry of the client computing device 950, the encryption rules repository 908, a directory of the file system 902, a special purpose memory device (not shown) of the client computing device 950, a special purpose location within a memory device of the client computing device 950, and the like. In some cases, the encrypted private key may be embedded with a file that is encrypted with a data encryption key, which is itself encrypted by a public key corresponding to the encrypted private key. The encrypted data encryption key may also be embedded with the file.

At block 1018, the encryption module 922 discards the private key, the passphrase, and the hashed passphrase for each user. In addition, the block 1018 may include discarding the private key for the client computing device 950. Discarding the private key for the users and the client computing device 950 may include discarding unencrypted private keys. Thus, in certain embodiments, a private key may exist in its unencrypted form during generation of the private key and during decryption of a data encryption key that was encrypted with a public key corresponding to the private key. In such instances, the private key may only exist in an encrypted form during time periods other than asymmetric key generation and decryption of a data encryption key.

Although the operations of the process 1000 have been described following a specific order, the process 1000 is not limited as such. For instance, in some cases, operations may be performed in a different order (e.g., the operations associated with the block 1010 may be performed prior to the operations associated with the block 1002). Further, in some cases, operations may be performed serially or substantially in parallel. For instance, the blocks 1002 and 1010 may be performed substantially in parallel.

Example Primary Storage File Encryption Process

Figure 10B:
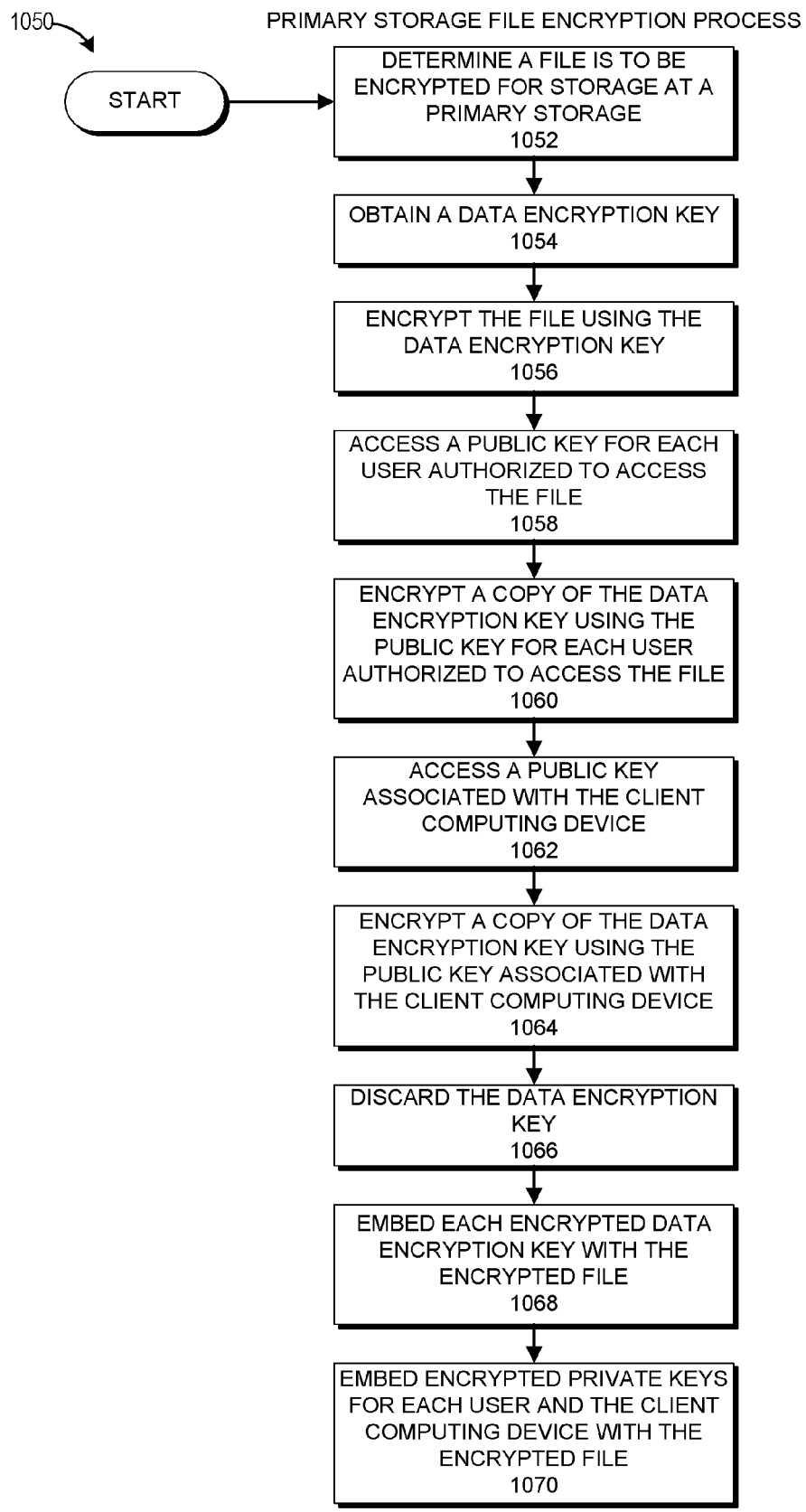
FIG. 10B illustrates an example embodiment of a primary storage file encryption process.

FIG. 10B illustrates an example embodiment of a primary storage encryption process 1050. The process 1050 can be implemented, at least in part, by any system that can encrypt a file for storage on a primary storage device (e.g., the primary storage device 104 or the primary storage device 960). Further, the process 1050 can be performed by any system that can encrypt the key used to encrypt the file with user and/or system specific keys, which may be embedded with the encrypted file. For example, the process 1050, in whole or in part, can be implemented by the filter driver 204, the file system data agent 904, the authentication system 906, the file monitor 930, the encryption rules engine 926, the interface agent 920, and the encryption module 922, to name a few. Although any number of systems, in whole or in part, can implement the process 1050, to simplify discussion, portions of the process 1050 will be described with reference to particular systems.

The process 1050 begins at block 1052 where, for example, the encryption rules engine 926 determines that a file is to be encrypted for storage at a primary storage device 960. The encryption rules engine 926 may determine that the file is to be encrypted based, at least in part, on metadata associated with the file (e.g., the file type, the file storage location). Further, the determination may be based, at least in part, on encryption rules, which may be stored at the encryption rules repository 908 and which may be associated with the file based on the file's metadata. For example, all word processing files with a particular extension may be associated with an encryption rule that states that word processing files should be encrypted at the primary storage device 960 each time the files are closed. Alternatively, the encryption rules engine 926 may determine that a file is to be encrypted in response to an action by a user or application. In some embodiments, the block 1052 may occur in response to a command from a user, application 954, or system (e.g., the storage manager 140). Alternatively, the block 1052 may occur as part of an existing process (e.g., during or at the end of a backup process to a secondary storage computing device 106 or a secondary storage device 108).

At block 1054, the encryption module 922 obtains a data encryption key. This data encryption key can include any type of symmetric key. For example, the symmetric key can be an Advanced Encryption Standard (AES) key. Further, the key may be based on a stream cipher (e.g., RC4, A5/1, etc.) or a block cipher (e.g., Blowfish, DES, etc.). In some cases, the data encryption key may be an asymmetric key. In some cases, the encryption module 922 may obtain the key by accessing a key repository and/or by accessing the encryption rules repository 908. Alternatively, the encryption module 922 may obtain the key from the storage manager 140. In some cases, the encryption module 922 may generate the data encryption key. Generally, the data encryption key is unique for a file. However, in some cases, the data encryption key may be shared among a set of files. For example, the data encryption key may be used for each file in a directory. In certain embodiments, the data encryption key may be based on the file. In other cases, the data encryption key may be generated independently of the file.

Using the data encryption key, the encryption module 922 encrypts the file at block 1056. At block 1058, the encryption module 922 accesses a public key for each user who is authorized to access the file. The encryption module 922 may determine the users who are authorized to access the file based on metadata associated with the file and/or based on users who are authorized to access the client computing device 950 and/or the primary storage 960 or a storage location thereon (e.g., a directory). Further, the encryption module 922 may access the public keys by accessing one or more of the storage locations previously described with respect to the block 1016. Although the same types of storage locations may be used to store the public keys and the encrypted private keys, the storage used to store the public keys and the private keys may or may not be the same storage. For example, the encrypted private keys may be stored in a special encrypted key store, while the corresponding public keys may be stored in an unencrypted key manager (not shown) or a location of the primary storage 960. As mentioned previously, a user may be associated with multiple asymmetric key pairs. In such cases, the block 1058 may include determining the public key of the user to access based on the file to be encrypted and/or the location of the file to be encrypted. Alternatively, or in addition, the public key may be selected based on a desired encryption level.

At block 1060, the encryption module 922 encrypts, for each user who is authorized to access the file, a copy of the data encryption key using the public key associated with the user identified or accessed at the block 1058. In some embodiments, the blocks 1058 and 1060 are optional. For example, the data encryption key used to encrypt the file may be secured using only keys associated with the client computing device 950, as described with respect to the blocks 1062-1064.

At block 1062, the encryption module 922 accesses a public key associated with the client computing device 950. As with the block 1058, the encryption module 922 may access the public key associated with the client computing device 950 by accessing one or more of the storage locations previously described with respect to the block 1016. Further, as with the user public keys, in some cases the client computing device 950 may be associated with multiple asymmetric key pairs. In such cases, the block 1062 may include determining the public key of the client computing device 950 to access at the block 1062 based on the file to be encrypted the location of the file to be encrypted and/or a desired encryption level.

At block 1064, the encryption module 922 encrypts a copy of the data encryption key using the public key identified and/or accessed at the block 1062. In some embodiments, the blocks 1062 and 1064 are optional. For example, the data encryption key used to encrypt the file may be secured using only keys associated with users, as described with respect to the blocks 1058-1060.

At block 1066, the encryption module 922 discards the data encryption key. Discarding the data encryption key may include discarding unencrypted copies of the data encryption key from the client computing device 950.

The encryption module 922 embeds each encrypted data encryption key with the encrypted file at block 1068. Embedding the encrypted data encryption keys with the file may include storing the encrypted data encryption keys with the encrypted file in a single file. In some cases, the block 1068 may include the encrypted data encryption keys with the file without embedding the keys with the file. For example, the encrypted data encryption keys may be stored with the encrypted file (e.g., in the same directory or an adjacent block of memory). In other cases, the encrypted data encryption keys may be stored in a separate location. In such cases, the encrypted data encryption keys may be associated with the encrypted file, for example, based on a relationship in a table or using any other mechanism to associate the encrypted data encryption keys with the encrypted file.

At block 1070, the encryption module 922 embeds encrypted private keys for each user and the client computing device with the encrypted file. These encrypted private keys correspond to the public keys accessed at blocks 1058 and 1062. Further, the private keys may be encrypted as previously described with respect to the process 1000. In some embodiments, the block 1070 is optional and/or omitted. For example, the encrypted private keys may be stored at the storage manager 140, at a secure store of the client computing device 950, or in any other location as previously described with respect to the block 1016.

Second Example File Backup Process

Figure 11:
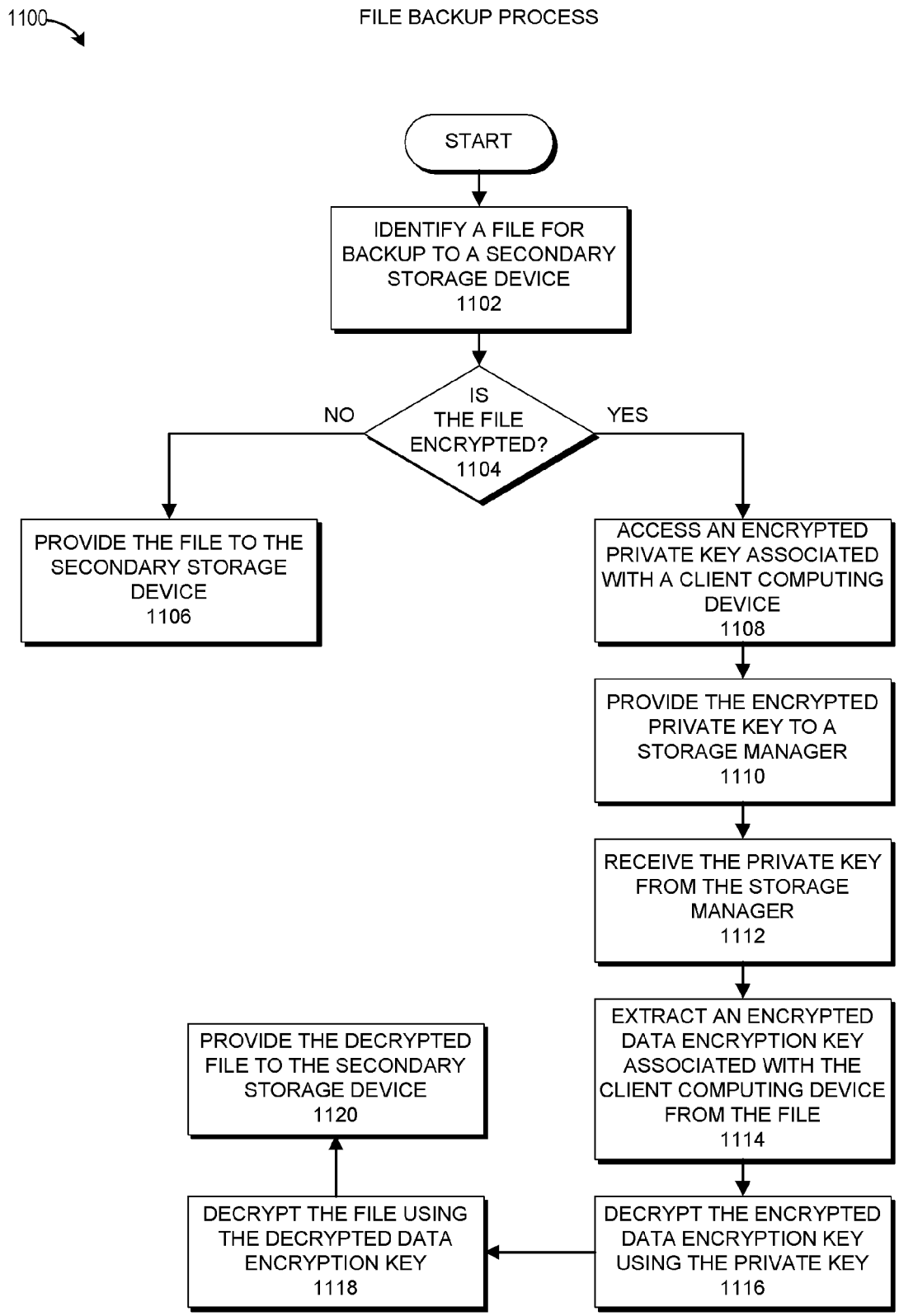
FIG. 11 illustrates a second example embodiment of a file backup process.

FIG. 11 illustrates a second example embodiment of a file backup process 1100. The process 1100 can be implemented, at least in part, by any system that can backup a file to a secondary storage device 108. For example, the process 1100, in whole or in part, can be implemented by the filter driver 204, the file system data agent 904, the secure file access module 924, the decryption module 928, the file monitor 930, and the storage manager 140, to name a few. Although any number of systems, in whole or in part, can implement the process 1100, to simplify discussion, portions of the process 1100 will be described with reference to particular systems.

As described below, the process 1100 includes decrypting an encrypted file, which may be stored at a primary storage device 960, and providing the decrypted file to a secondary storage device 108, which may or may not re-encrypt the file before storing the file. In certain embodiments, the encrypted file is decrypted as part of the process 1100 to enable single instancing. In other words, in some cases, by decrypting the file before backing up the file, the secondary storage can keep one copy of a file or data to which multiple users or computing devices may share access. Further, decrypting the file before backing it up enables deduplication at the secondary storage. In some embodiments, the process 1100 may be performed transparently and/or automatically when a user grants a backup system permission to decrypt files using the user's private key. This permission may be granted at the time that the file is protected or encrypted. Alternatively, the permission may be granted at a later time. In some cases, when the user is granting a backup system permission to backup encrypted files, the user may provide the backup system with access to the user's private key. Alternatively, in some cases, the process 1100 may be performed without the user granting permission to use the user's private key. For example, the process 1100 may be performed using the private key associated with the client computing device 950. In some such cases, the user may have previously indicated that a backup system is authorized to access one or more of the encrypted files.

The process 1100 begins at block 1102 where, for example, the file monitor 930 identifies a file for backup to a secondary storage device 108. The file may be identified for backup in response to a user command or a command from a storage manager 140. In other cases, the file may be identified for backup as part of a scheduled backup process that may occur once, or on a scheduled basis (e.g., nightly, weekly, monthly, etc.). Further, in some cases, the file may be identified for backup based on the storage location of the file in the primary storage device 960. For example, files in a particular directory may be identified or scheduled for backup.

At decision block 1104, the secure file access module 924 determines whether the file identified for backup is encrypted. If the secure file access module 924 determines that the file is not encrypted, the file system data agent 904 provides the file to the secondary storage device 108 at block 1106. Providing the file to the secondary storage device 108 may include providing the file to a media agent 144 of a secondary storage computing device 106, which can then process the file for backup storage at a secondary storage device 108. Processing the file for backup can include the secondary storage computing device 106 encrypting the file.

If at decision block 1104 the secure file access module 924 determines that the file is encrypted, the decryption module 928 accesses an encrypted private key for the file that is associated with the client computing device 950 at block 1108. Accessing the encrypted private key can include extracting the encrypted private key from the encrypted file. In other cases, the encrypted private key may be accessed from a secure storage area of the primary storage device 960.

At block 1110, the file system data agent 904 provides the encrypted private key to the storage manager 140. In some embodiments, providing the encrypted private key to the storage manager 140 includes providing an identity of the client computing device 950 to the storage manager 140. Further, in some cases, the block 1110 may include providing authentication information for a user who is accessing the client computing device 950 to the storage manager 140.

The storage manager 140 can decrypt the encrypted private key using a passphrase associated with the client computing device 950. The storage manager 140 may identify the passphrase based on the received encrypted private key and/or the identity information received from the client computing device 950. The storage manager 140 may hash the passphrase associated with the client computing device 950 and use the hashed passphrase to decrypt the encrypted private key. In some cases, the passphrase may be stored in its hashed form thereby making it unnecessary to hash the passphrase at the time of decryption of the encrypted private key for the client computing device 950.

In some embodiments, the storage manager 140 may determine whether the passphrase associated with the client computing device 950 is active. If the passphrase is active, the storage manager 140 can use the passphrase to decrypt the encrypted private key. However, if the passphrase is marked as inactive, lost, or stolen, then the storage manager 140 may reject the request to decrypt the encrypted private key. Advantageously, when a client computing device 950 has been compromised, lost, stolen, or is no longer trusted, a user (e.g., an administrator) may indicate to the storage manager 140 that requests from the client computing device 950 should no longer be accepted. In response, the storage manager 140 can mark passphrases associated with the client computing device 950 as inactive thereby preventing requests to access encrypted files from the client computing device 950 from being processed.

At block 1112, assuming the passphrase associated with the client computing device 950 is active at the storage manager 140, the file system data agent 904 receives the private key from the storage manager 140. The private key received at the block 1112 may be the decrypted version of the encrypted private key provided to the storage manager 140 at the block 1110.

The decryption module 928 extracts an encrypted data encryption key associated with the client computing device 950 from the file at block 1114. In some cases, the encrypted data encryption key is accessed from a storage location at the client computing device 950 and/or the primary storage device 960. The encrypted data encryption key may be identified by accessing a data structure, such as a table, the associates the encrypted data encryption keys with the corresponding files. Further the data structure may associate each of the encrypted data encryption keys for a file with corresponding systems and/or users.

At block 1116, the decryption module 928 decrypts the encrypted data encryption key using the private key obtained at the block 1112. The decryption module 928 then decrypts the file using the decrypted data encryption key at block 1118. The decrypted file is provided to the secondary storage device 108, or to the secondary storage computing device 106, at block 1120. In some embodiments, the block 1120 may also include deleting or discarding the decrypted data encryption key and/or private key. Further, the block 1120 may include deleting the decrypted file after it is provided to the secondary storage device 108.

In some embodiments, the process 1100 may include using a private key associated with a user instead of the private key associated with the client computing device 950. In such embodiments, block 1108 may include accessing an encrypted private key associated with a user who, for example, initiated the file backup process. Further, the blocks 1110 and 1112 may include accessing a passphrase from the user by, for example, requesting the user provide the passphrase and/or accessing the passphrase from the authentication system 906, which may have obtained the passphrase during an authentication process of the user. The passphrase may then be hashed by the decryption module 928 and used to decrypt the user's encrypted private key. At block 1114, the decryption module 928 can extract an encrypted data encryption associated with the user. This encrypted data encryption key may be decrypted at the block 1116 using the private key of the user.

The process 1100, in some embodiments, may be used for accessing the file by a user, an application, or system other than the secondary storage device 108. In such embodiments, the decrypted file is presented to the requestor of the file at the block 1120. For instance, the file may be presented to a user who is authorized to access the file. The user's authorization may be determined based, at least in part, on whether a data encryption key that was encrypted with a key associated with the user exists.

Example Client Passphrase Replacement Process

Figure 12:
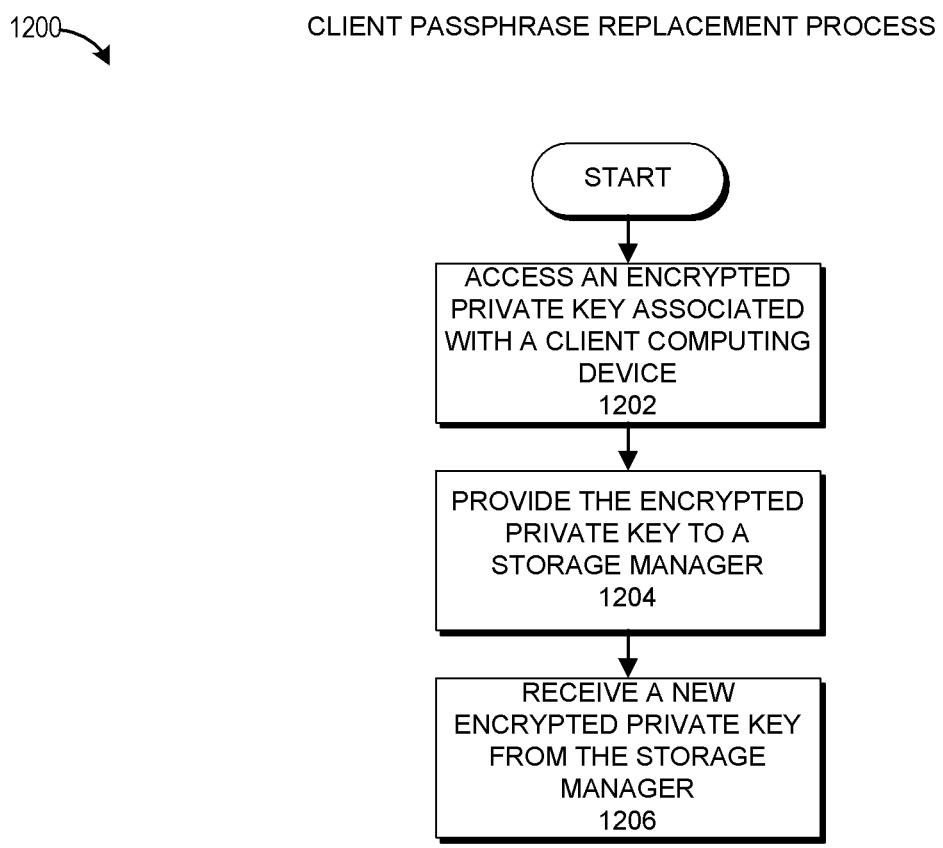
FIG. 12 illustrates an example embodiment of a client passphrase replacement process.

FIG. 12 illustrates an example embodiment of a client passphrase replacement process 1200. The process 1200 can be implemented, at least in part, by any system that can access an encrypted private key associated with or assigned to a client computing device and can replace the passphrase used to encrypt the encrypted private key. For example, the process 1200, in whole or in part, can be implemented by the filter driver 204, the file system data agent 904, the secure file access module 924, the encryption module 922, the decryption module 928, the file monitor 930, and the storage manager 140, to name a few. Although any number of systems, in whole or in part, can implement the process 1200, to simplify discussion, portions of the process 1200 will be described with reference to particular systems.

The process 1200 may be performed in response to a detected integrity breach with respect to a client computing device 950 or storage manager 140. This integrity breach may include a detected unauthorized access or an attempted unauthorized access of the client computing device 950 or storage manager 140. The unauthorized access may include an attempt, successful or otherwise, to access or decrypt a private key associated with the client computing device 950. Alternatively, or in addition, the process 1200 may be performed at a scheduled time to update or replace system passphrases for one or more client computing devices 950. Further, as will be described in more detail below, the process 1200 may be used to replace user passphrases.

The process 1200 begins at block 1202 where, for example, the file system data agent 904 accesses an encrypted private key associated with a client computing device 950. This encrypted private key may be specific to a file or set of files stored at the primary storage device 960 or accessible by the client computing device 950. Alternatively, the encrypted private key may be specific to the client computing device 950 and may be used for any file that the client computing device 950 can access.

At block 1204, the file system data agent 904 provides the encrypted private key to the storage manager 140. In some cases, the block 1204 includes providing an identity of the client computing device 950 to the storage manager 140. The storage manager 140 can decrypt the encrypted private key using a passphrase or hashed passphrase associated with the client computing device 950. The storage manager can then access a new passphrase, or can generate a new passphrase, for the client computing device 950. This new passphrase can be hashed and used to encrypt the decrypted private key to obtain an updated encrypted private key that is encrypted based on the new passphrase for the client computing device 950. The new passphrase may be assigned to the client computing device 950 and may be identified as active at the storage manager 140. The previous passphrase that was assigned to the client computing device 950 can be identified as inactive thereby preventing decryption of versions of the private key that were encrypted using the previous passphrase of the client computing device 950. In some embodiments, the block 1204 can include one or more embodiments described above with respect to the block 1110.

The file system data agent 904 receives a new encrypted private key from the storage manager 140 at block 1206. This new encrypted private key can be the updated encrypted private key created by the storage manager 140 and assigned to the client computing device 950. Using the process 1200, the passphrase of the client computing device 950 may be updated while maintaining the same asymmetric key pair for the client computing device 950. An example of an embodiment for updating the asymmetric key pair for the client computing device 950 will be described below with respect to FIG. 13.

As previously mentioned, a modified version of the process 1200 may be used to update a passphrase for a user. In such embodiments, the file system data agent 904 accesses an encrypted key associated with a user at the block 1202. In some cases, the file system data agent 904 may still provide the encrypted private key to the storage manager 140, which may obtain the user's passphrase from the user and decrypt the encrypted private key. In such cases, the storage manager 140 may also obtain a new passphrase from the user, or generate a new passphrase for the user, and encrypt the private key with the new passphrase, or a hashed version thereof, and provide the new encrypted private key to the client computing device 950.

However, in other embodiments, Instead of providing the encrypted private key to the storage manger 140, the file system data agent 904 can obtain the user's passphrase. The user may be prompted for the passphrase or the passphrase may be obtain from the authentication system 906, which may have obtained the passphrase when the user was authenticated by the authentication system 906 during, for example, a login process. The decryption module 928 may hash the passphrase and use the hashed passphrase to decrypt the encrypted private encryption key. The encryption module 922 can obtain a new passphrase for the user by, for example, prompting the user for a new passphrase. The encryption module 922 can then hash the new passphrase and use the hashed version of the new passphrase to encrypt the private key. Any unencrypted copies of the private key can be discarded. Further, the passphrase provided by the user may also be discarded.

In some embodiments, instead of decrypting an encrypted private key and using a new passphrase to re-encrypt the private key, a new asymmetric key pair may be generated for a user or a client computing device 950. In such cases, the old private key may be used to obtain access to the data encryption key. The data encryption key can then be encrypted using the new private key. The encrypted copy of the data encryption key can then be embedded or stored with the one or more files for which the data encryption key corresponds. In some implementations, instead of using the old private key to obtain access to the data encryption key, another private key may be used. For example, if the passphrase is being replaced for a user, the private key of the client computing device 950 may be used to obtain access to the data encryption key.

In some embodiments, the data encryption key encrypted with the old public key corresponding to the old private key may be discarded. In other cases, it may be left with the file, or at its storage location.

Example of a Client Key Rotation Process

Figure 13:
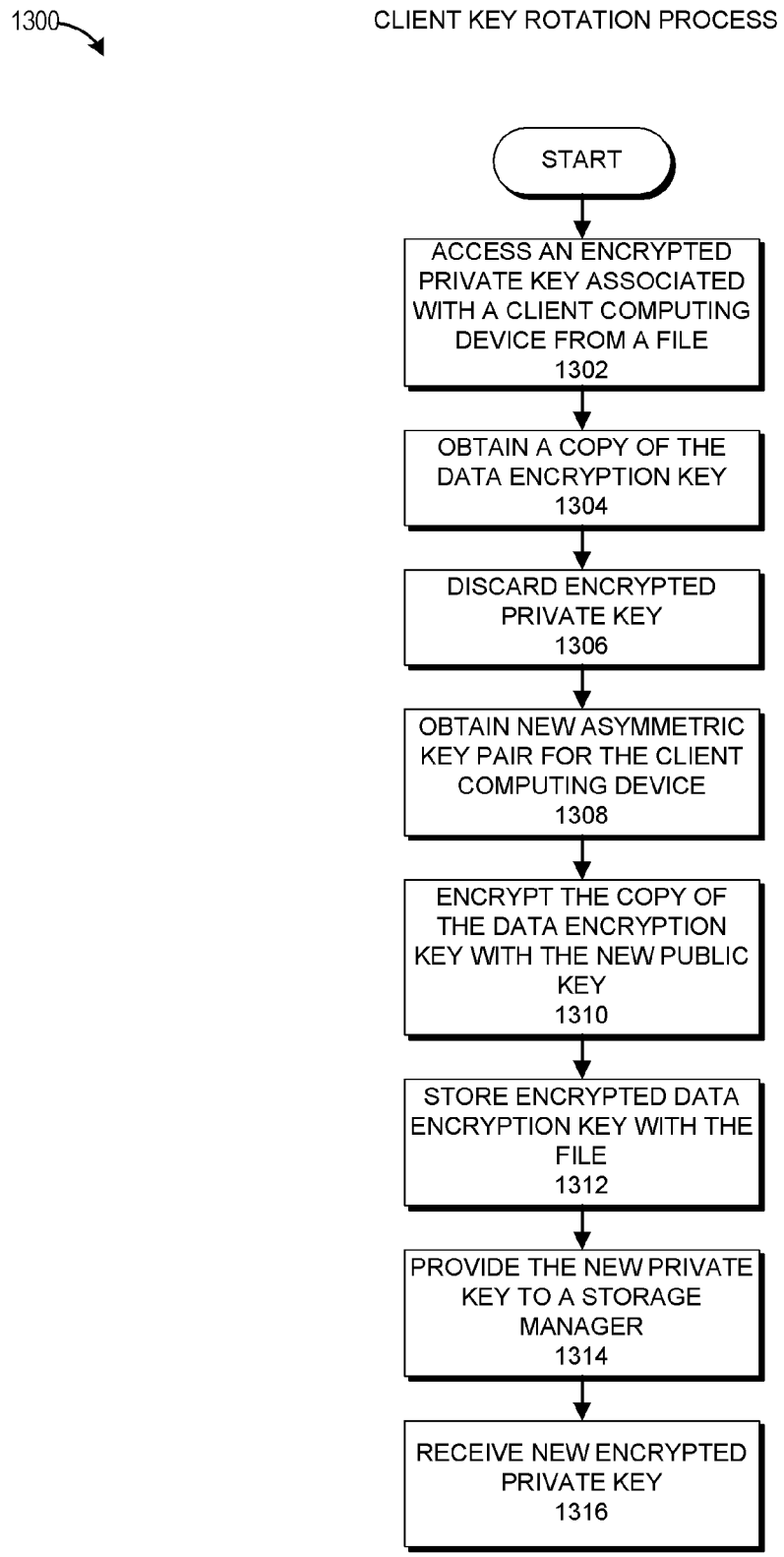
FIG. 13 illustrates an example embodiment of a client key replacement process.

FIG. 13 illustrates an example embodiment of a client key rotation and/or replacement process 1300. The process 1300 can be implemented, at least in part, by any system that can access an encrypted private key associated with or assigned to a client computing device and can replace the private key with a new private key for the client computing device as part of a process for replacing an asymmetric key pair associated with the client computing device. For example, the process 1300, in whole or in part, can be implemented by the filter driver 204, the file system data agent 904, the secure file access module 924, the encryption module 922, the decryption module 928, the file monitor 930, and the storage manager 140, to name a few. Although any number of systems, in whole or in part, can implement the process 1300, to simplify discussion, portions of the process 1300 will be described with reference to particular systems.

As with the process 1200, the process 1300 may be performed in response to a detected integrity breach with respect to a client computing device 950 or storage manager 140. This integrity breach may include a detected unauthorized access or an attempted unauthorized access of the client computing device 950 or storage manager 140. The unauthorized access may include an attempt, successful or otherwise, to access or decrypt a private key associated with the client computing device 950. Alternatively, or in addition, the process 1300 may be performed at a scheduled time to update or replace system passphrases for one or more client computing devices 950. Further, as will be described in more detail below, the process 1300 may be used to replace asymmetric keys associated with a user. Moreover, in some cases, the process 1300 can be performed in combination with the process 1200 to replace both an asymmetric key pair and a passphrase for a client computing device 950 and/or a user.

The process 1300 begins at block 1302 where, for example, the file system data agent 904 accesses an encrypted private key associated with a client computing device 950 from a file. In some embodiments, the block 1302 may include one or more embodiments described above with respect to the block 1202.

At block 1304, the file system data agent 904 obtains a copy of the data encryption key for the file. Obtaining the copy of the data encryption key may include decrypting a copy of an encrypted private key associated with the client computing device 950 and using the decrypted private key to decrypt an encrypted copy of the data encryption key as was previously described with respect to the blocks 1108-1116.

At block 1306, the file system data agent 904 discards the encrypted private key associated with the client computing device 950. Discarding the private key of the client computing device 950 can include discarding copies of the client computing device's 950 corresponding public key. In some embodiments, the block 1306 may be optional. For example, in some cases, the passphrase used to encrypt the private key may be classified as inactive at the storage manager 140 thereby causing the storage manager 140 to reject attempts to decrypt the encrypted private key.

The file system data agent 904 obtains a new asymmetric key pair for the client computing device 950 at the block 1308. As previously mentioned, the asymmetric key pairs can be obtained using an RSA scheme, or any other type of asymmetric encryption scheme. Further, in some cases, the encryption module 922 can generate the asymmetric encryption keys.

At block 1310, the encryption module 922 encrypts the copy of the data encryption key using one of the keys (e.g., a public key) from the new asymmetric key pair. The encryption module 922, at block 1312, stores the encrypted data encryption key with the file by, for example, embedding the encrypted data encryption key into the file or by storing the encrypted data encryption key in an adjacent memory block. Alternatively, the encrypted data encryption key may be stored in a designated storage area of the client computing device 950 for storing encryption keys, such as a hardware key manager or in a protected area of memory. As another alternative, the encrypted data encryption key may be stored in a designated area of the primary storage device 960.

At block 1314, the file system data agent 904 provides the second key (e.g., a private key) from the new asymmetric key pair to the storage manager 140. The storage manager 140 can encrypt the private key using a passphrase or a hashed passphrase associated with the client computing device 950. In some embodiments, the storage manager 140 may select a new passphrase for the client computing device 950 and use the new passphrase, or a hashed version thereof, to encrypt the private key. Thus, in some cases, the process 1200 may be performed in combination with the process 1300. Further, in certain embodiments, the block 1314 can include one or more of the embodiments described above with respect to the block 1204.

At block 1316, the file system data agent 904 receives the new encrypted private key from the storage manager 140. In some embodiments, the block 1316 can include one or more of the embodiments described above with respect to the block 1206.

As previously mentioned, the process 1300, or a modified version thereof, may be used to replace an asymmetric key pair for a user. In such embodiments, the encrypted private key obtained at the block 1302 is the encrypted private key for the user whose encryption keys are being replaced. Further, obtaining the copy of the data encryption key may include obtaining the user's passphrase by, for example, prompting the user for the passphrase or obtaining the passphrase from the authentication system 906 as previously described. The passphrase may then be hashed and the hashed passphrase can be used to decrypt the encrypted private key. The decrypted private key can then be used to decrypt the encrypted data encryption key associated with the user for the file to obtain the data encryption key. As with the process for replacing the asymmetric key pair of the client computing device 950, the private key of the user may be discarded and a new asymmetric key pair for the user may be obtained. One of the asymmetric keys (e.g., the public key) can be used to encrypt the copy of the data encryption key at block 1310. The encrypted data encryption key can be stored with the file at block 1312. The second asymmetric key (e.g., the private key) can be encrypted using a passphrase, or hashed passphrase, associated with the user. This may by the same passphrase for the user obtained during the process of decrypting the copy of the data encryption key at the block 1304. Alternatively, the file system data agent 904 may obtain a new passphrase for the user by, for example, prompting the user for a new passphrase.

In some embodiments, the process 1300, or a modified version thereof, may be used to provide additional users or client computing devices with access to an encrypted file. In such embodiments, the block 1302 and 1304 may be performed to obtain access to a data encryption key. However, rather than discarding an encrypted private key or obtaining a new asymmetric key pair for the client computing device 950 or a user that is associated with an existing copy of an encrypted data encryption key for the file, an asymmetric key pair is obtained or generated for a new client computing device and/or user at the block 1308. The blocks 1310-1316 may then be performed using the new asymmetric key pair for the new client computing device. Alternatively, the process described in the previous paragraph with respect to the blocks 1310-1316 may be used to encrypt a copy of the data encryption key and the private key for the new user.

To remove authorization to access a file for a client computing device and/or for a user, the file system data agent 904 can obtain or extract the encrypted copy of the data encryption key for the file corresponding to the client computing device or user whose authorization to access the file is being removed. This encryption copy of the data encryption key can then be deleted or discarded thereby preventing the client computing device or user from being able to obtain a decrypted version of the data encryption key for the file.

In certain embodiments, a new asymmetric key pair may be selected for the client computing device 950 using, for example, the process associated with the block 1308. However, a data key for a file may not be encrypted with the new private key of the new asymmetric key pair until the file is accessed by a user, or a system in the performance of an operation, such as a backup process. For example, a new asymmetric key pair may be selected for the client computing device 950 at a time X. At some later time Y, a file may be accessed using an old private key of the client computing device 950 associated with an older asymmetric key pair. After the data encryption key is obtained for the file, it may be reencrypted using the new public key of the new asymmetric key pair. The new private key can then be provided to the storage manger 140 for encryption using the client computing device's passphrase or hashed passphrase.

It is possible to rotate the asymmetric keys at some time subsequent to the replacement of the asymmetric key pairs because, for example, the storage manager 140 can maintain the passphrase of the client computing device 950, even if the passphrase has been updated. Thus, for example, if a new asymmetric key pair is assigned to the client computing device 950 and a new passphrase is generated for the client computing device 950 to encrypt or obfuscate the private key of the new asymmetric key pair, the old passphrase may still be used to access the old private key at the time that a file is first accessed subsequent to the client computing device 950 being associated with a new asymmetric key pair. Once the data encryption key is extracted using the old asymmetric key pair, it can by protected using the new asymmetric key pair. In some cases, if there are no other files with data encryption keys that were secured using the old asymmetric key pair, the old asymmetric key pair can then be discarded.

Alternatively, in some embodiments, the data encryption keys for a set of files may be reencrypted using the new asymmetric key pair for the client computing device 950 as part of a background and/or low-priority process. For instance, when the client computing device 950 is idle, or not being accessed by a user, files stored on the primary storage device 960 may be accessed to rotate the client computing device's 950 asymmetric key pair using, for example the process 1300.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method for backing up a file, the method comprising:
receiving, at a media agent hosted by a secondary computing device comprising one or more hardware processors, a command from a storage manager to backup a file at a secondary storage device, the storage manager comprising one or more hardware processors programmed to manage data within an information management system comprising a plurality of client computing devices and a plurality of secondary computing devices;
receiving the file at the media agent from a data agent hosted by a client computing device from the plurality of client computing devices, wherein the client computing device differs from the secondary computing device, wherein the media agent is programmed as an interface to the secondary storage device for the client computing device, and wherein the data agent is programmed as a data manager at the client computing device for managing data, including the file, stored at a primary storage device;
determining whether the file is an encrypted file;
in response to determining that the file is an encrypted file:
identifying an encryption algorithm used to encrypt the file;
storing metadata associated with the file, the metadata including an identity of the encryption algorithm; and
storing the file at the secondary storage device without performing an encryption process; and
in response to determining that the file is not an encrypted file:
encrypting the file to obtain an encrypted file; and
storing the encrypted file at the secondary storage device.

2. The method of claim 1, wherein the command is received as part of an execution of a backup policy.

3. The method of claim 1, further comprising determining whether the file is an encrypted file based, at least in part, on a file extension of the file.

4. The method of claim 1, further comprising determining whether the file is an encrypted file based, at least in part, on the command received from the storage manager.

5. The method of claim 1, wherein, in response to determining that the file is not an encrypted file, the method further comprises:
selecting an encryption algorithm for encrypting the file; and
storing metadata associated with the file, the metadata including an identity of the encryption algorithm.

6. The method of claim 5, wherein the encryption algorithm is selected based, at least in part, on the command received from the storage manager.

7. The method of claim 1, wherein the secondary storage device is one of a plurality of secondary storage devices.

8. The method of claim 7, further comprising selecting the secondary storage device from the plurality of secondary storage devices based, at least in part, on the command received from the storage manager file.

9. The method of claim 1, wherein, in response to determining that the file is an encrypted file, the method further comprises storing a cached copy of the file at the media agent.

10. The method of claim 1, wherein, in response to determining that the file is not an encrypted file, the method further comprises storing a cached copy of the encrypted file at the media agent.

11. A system for backing up a file, the system comprising:
a primary storage device configured to store a set of files;
a secondary storage device configured to store a backup of a file from the set of files;

a storage manager comprising one or more hardware processors programmed to manage data within an information management system comprising a plurality of client computing devices and a plurality of secondary computing devices, the storage manager programmed to initiate the backup of the file, wherein initiating the backup of the file comprises sending a first backup command to a data agent;

the data agent hosted by a client computing device from the plurality of client computing devices, wherein the client computing device differs from a secondary computing device, and wherein the data agent is programmed as a data manager at the client computing device for managing data, including the file, stored at the primary storage device, and wherein the data agent is further programmed to provide the file to a media agent responsive to receiving the first backup command; and the media agent hosted by the secondary computing device comprising one or more hardware processors, wherein the media agent is programmed as an interface to the secondary storage device for the client computing device, and wherein the media agent is further programmed to:

receive the file from the data agent;

determine whether the file is an encrypted file;

in response to determining that the file is an encrypted file:
  identify an encryption algorithm used to encrypt the file;
  store metadata associated with the file, the metadata including an identity of the encryption algorithm; and
  store the file at the secondary storage device without performing an encryption process; and in response to determining that the file is not an encrypted file, encrypt the file to obtain an encrypted file and store the encrypted file at the secondary storage device.

12. The system of claim 11, wherein the storage manager is further configured to send a second backup command to the media agent.

13. The system of claim 12, wherein the media agent is further configured to select the secondary storage device from a plurality of secondary storage devices based, at least in part, on the second backup command.

14. The system of claim 12, wherein the media agent is further configured to select the encryption algorithm based, at least in part, on the second backup command.

15. The system of claim 11, wherein providing the file to the media agent comprises providing a copy of the file to the media agent.

16. The system of claim 11, wherein the media agent is further configured to identify an encryption algorithm used to encrypt the file in response to determining that the file is encrypted.

17. The system of claim 16, further comprising a media agent database configured to store metadata associated with the file, wherein the media agent is further configured to store the identity of the encryption algorithm at the media agent database.

18. The system of claim 16, wherein the secondary storage device is one of a plurality of secondary storage devices and wherein the metadata includes the identity of the secondary storage device that includes the backup of the file.

19. The system of claim 11, wherein the data agent is one of a plurality of data agents and wherein the data agent is selected from the plurality of data agents based, at least in part, on a file type of the file.

20. The system of claim 11, wherein the media agent is further configured to store, for a time period, a cached copy of the file stored at the secondary storage device.

* * * * *